US008682376B2

(12) United States Patent
Franceschini et al.

(10) Patent No.: US 8,682,376 B2
(45) Date of Patent: Mar. 25, 2014

(54) METHOD AND SYSTEM FOR TRANSMITTING CONTENT TO A PLURALITY OF USERS OF A MOBILE COMMUNICATION NETWORK

(75) Inventors: Daniele Franceschini, Turin (IT); Claudio Guerrini, Turin (IT); Marco Caretti, Turin (IT)

(73) Assignee: Telecom Italia S.p.A., Milan (IT)

( * ) Notice: Subject to any disclaimer, the term of this patent is extended or adjusted under 35 U.S.C. 154(b) by 1171 days.

(21) Appl. No.: 11/921,558

(22) PCT Filed: Jun. 8, 2005

(86) PCT No.: PCT/EP2005/006139
§ 371 (c)(1),
(2), (4) Date: Jul. 9, 2009

(87) PCT Pub. No.: WO2006/131131
PCT Pub. Date: Dec. 14, 2006

(65) Prior Publication Data
US 2009/0305712 A1 Dec. 10, 2009

(51) Int. Cl.
*H04B 7/00* (2006.01)
(52) U.S. Cl.
USPC .............................. 455/522; 455/69
(58) Field of Classification Search
USPC ............... 455/522, 69; 370/318, 310.2
See application file for complete search history.

(56) References Cited

U.S. PATENT DOCUMENTS

| 6,539,010 | B1 * | 3/2003 | Hagerman et al. | 370/347 |
| 2003/0109274 | A1 * | 6/2003 | Budka et al. | 455/522 |
| 2003/0119452 | A1 | 6/2003 | Kim et al. | |
| 2004/0116125 | A1 * | 6/2004 | Terry | 455/450 |
| 2004/0209638 | A1 | 10/2004 | Beckman et al. | |

(Continued)

FOREIGN PATENT DOCUMENTS

EP    1 492 249 A1    12/2004

OTHER PUBLICATIONS $3^{rd}$ Generation Partnership Project; Technical Specification Group Radio Access Network; Radio Interface Protocol Architecture (Release 6), 3GPP TS 25.301 V6.2.0, pp. 1-4 and 14-35, (Mar. 2005).

(Continued)

*Primary Examiner* — Barry Taylor
(74) *Attorney, Agent, or Firm* — Finnegan, Henderson, Farabow, Garrett & Dunner, L.L.P.

(57) ABSTRACT

A method of distributing information content to at least two user equipments includes: setting up a common downlink channel common to the at least two user equipments; setting up at least two uplink channels, each uplink channel being dedicated to a respective one of the at least two user equipments; delivering the information content to the at least two user equipments over the common downlink channel; and controlling transmission powers related to the common downlink channel and the at least two uplink channels in a closed-loop fashion. The closed-loop fashion power control includes: receiving from the at least two user equipments common downlink channel quality indications over the respective dedicated uplink channels; adjusting a transmission power in respect to the common downlink channel based on the common downlink channel quality indications received from the user equipments; evaluating a channel quality with respect to each of the at least two dedicated uplink channels; and based on the evaluation, sending to the at least two user equipments a transmission power control command over the common downlink channel.

28 Claims, 5 Drawing Sheets

(56) References Cited

U.S. PATENT DOCUMENTS

2004/0229572 A1* 11/2004 Cai et al. ............... 455/69
2006/0166690 A1*  7/2006 Nishio et al. ........... 455/522
2006/0189272 A1*  8/2006 Willenegger et al. ..... 455/3.01

OTHER PUBLICATIONS

3$^{rd}$ Generation Partnership Project; Technical Specification Group Radio Access Network; Radio Interface Protocol Architecture (Release 1999), 3GPP TS 25.301 V3.11.0, pp. 1-4 and 13-31, (Sep. 2002).

3$^{rd}$ Generation Partnership Project; Technical Specification Group Radio Access Network; Introduction of the Multimedia Broadcast Multicast Service (MBMS) in the Radio Access Network (RAN); Stage 2 (Release 6), 3GPP TS 25.346 V6.4.0, pp. 1-59, (Mar. 2005).

3$^{rd}$ Generation Partnership Project; Technical Specification Group Radio Access Network; Physical channels and mapping of transport channels onto physical channels (FDD) (Release 1999), 3GPP TS 25.211 V3.12.0, pp. 1-4 and 26-28 (Sep. 2002).

* cited by examiner

METHOD AND SYSTEM FOR TRANSMITTING CONTENT TO A PLURALITY OF USERS OF A MOBILE COMMUNICATION NETWORK

CROSS REFERENCE TO RELATED APPLICATION

This application is a national phase application based on PCT/EP2005/006139, filed Jun. 8, 2005, the content of which is incorporated herein by reference.

TECHNICAL FIELD OF THE INVENTION

The present invention generally relates to the field of mobile, radio communications, and particularly to the transmission of information content, in particular multimedia contents, to users of mobile telephony networks, particularly mobile networks using a Code Division Multiple Access (CDMA) radio interface, such as for example third generation (shortly, "3G") mobile telephony networks. More particularly, the invention relates to multimedia contents multicasting/broadcasting in 3G networks, e.g. in mobile networks using a CDMA radio interface.

BACKGROUND OF THE INVENTION

Mobile telephony networks (Public Land Mobile Networks, shortly PLMNs) were initially conceived for enabling voice communications, similarly to the wired networks (Public Switched Telephone Networks, PSTNs), but between mobile users. Mobile telephony networks have experienced an enormous spread, especially after the introduction of second-generation mobile cellular networks, and particularly digital mobile cellular networks such as those complying with the Global System for Mobile communications (GSM) standard (and its United States and Japanese corresponding systems).

The services offered by these cellular networks in addition to plain voice communications have rapidly increased in number and quality; just to cite a few examples, Short Message Service (SMS) and Multimedia Message Service (MMS) services, and Internet connectivity services have been made available in the last few years.

More recently, 3G mobile communication systems, like those complying to the Universal Mobile Telecommunications System (UMTS), are being deployed, bringing about significantly higher information exchange rates, allowing network operators to offer new services to the mobile users.

However, PLMNs are born as Circuit-Switched (CS) networks and, as such, are more suitable for voice communications than for exchanging relatively large amounts of data. Data communications are better achieved by adopting Packet-Switched (PS) schemes, like in computer networks, particularly the Internet. This remains true also for 3G mobile communications systems, despite their increased communications rate capabilities. The PS domain of the UMTS is constituted by a core network, which is the evolution of the GPRS core network, and a radio access network known as the UTRAN (UMTS Terrestrial Radio Access Network). The UTRAN complying with the 1999 release of the standard (so-called "R99") is able to support PS transmission up to 384 Kbps for the support of person-to-person or content/network-to-person communications, by means of dedicated connection over radio.

Usually, in PLMNs, even if provided with a UTRAN infrastructure, the information content is transferred in a Point-To-Point (P-T-P) or unicast mode, upon activation of a session between a User Equipment (UE) and a service provider connected to a packet data network, e.g. a server connected to the core network or to the Internet; the activation of such a session involves the setting up of logical and physical connections between the server and the UE. In such a P-T-P communication mode, the radio resources to be allocated for the exchange of data between the network and the UEs depend on the number of different mobile stations simultaneously exploiting the services, even if two or more users take advantage of the same information content at the same time. This limits the possibility of simultaneously accessing available services by several users, unless the radio resources are oversized.

Thus, it is desirable to have the possibility of delivering information contents related to a same service exploitable by two or more users at a time based on a different, Point-To-Multipoint (P-T-M) or multicast/broadcast mode, so as to save the amount of allocated radio resources.

In this respect, the 3GPP (3rd Generation Partnership Project) standardization group is discussing the implementation, both in the GERAN (GSM/EDGE Radio Access Network) and in the UTRAN (UMTS Terrestrial Radio Access Network) frameworks, of a new kind of service architecture, named MBMS (Multimedia Broadcast/Multicast Service). Basically, the MBMS targets the simultaneous distribution of information content (particularly, multimedia content) to more than one mobile user from a single serving base station over a common radio resource; this is for instance the case of short clips of sport matches delivered to UEs of mobile users, or of the television over mobile. In other words, PLMN operators experience the need of proper mechanisms in the network in order to efficiently transport simultaneously the same information content to specified groups of users.

The 3GPP Technical Specification (TS) 25.346 V.6.4.0 ("Introduction of the Multimedia Broadcast Multicast Service (MBMS) in the Radio Access Network (RAN)", hereinafter also referred to as "the 3GPP standard" or, shortly, "the standard"), relates to the introduction of the MBMS in the Terrestrial Radio Access Network (Terrestrial RAN) of a terrestrial UMTS network (the so-called UTRAN). The document describes techniques for optimized transmission of MBMS bearer service in the UTRAN, such as P-T-M transmission, selective combining and transmission mode selection between P-T-M and P-T-P: an MBMS service may be delivered in either P-T-P or P-T-M mode depending on the number of MBMS users in the generic cell (particularly, if the number of MBMS users in the cell does not exceed a certain operator-defined threshold, e.g. 4 to 6 users, the P-T-P mode is selected). In particular, from the radio point of view, the proposed solution provides for the support of broadcast/multicast services either by means of a plurality of P-T-P channels, each one dedicated to a respective MBMS user, or by means of P-T-M channels, using the downlink SCCPCH (Secondary Common Control Physical CHannel). The SCCPCH is a common physical channel on the downlink path that was already present in the Release 1999 of the standard (3GPP R99), and was intended to be used to carry the Forward Access transport CHannel (FACH), a transport channel that can carry radio signaling (it is mapped to the DCCH—Dedicated Control Channel—and the CCCH—Common Control CHannel) and short, low frequent user data (it is also mapped to the DTCH—Dedicated Traffic CHannel). In order to support P-T-M communications over the UMTS radio interface, in the Release 6 of the standard (3GPP R6) the FACH has been modified so as to allow the transport of three different logical channels, named MCCH (MBMS P-T-M Control Channel), MTCH (MBMS P-T-M Traffic Channel) and MSCH (MBMS P-T-M Scheduling Channel).

A drawback of the solution adopted in the standard for implementing the P-T-M delivery of an MBMS is that the FACH channel is not power controlled, and it is then transmitted at fixed power, or at best its power can be reconfigured in a slow way compared to the closed-loop power control which is instead implemented for normal, P-T-P channels such as the DCHs (Dedicated Channels); for this reason, a certain amount of power should be reserved for the delivery of an MBMS, in principle even when no MBMS users are present in the system; the power required by the FACH allocated for MBMSs may be a significant fraction of the total power. Power is however a scarce and thus precious resource in a system that, like the UMTS, is based on the WCDMA (Wide-band Code Division Multiple Access); it is for this reason that the standard relies on a P-T-P MBMS delivery mode over conventional, power-controlled, P-T-P DCHs when the number of MBMS users in a cell is limited.

In order to improve the downlink power management, the 3GPP standardization forum is introducing a set of combining functions for the SCCPCH channel designed for MBMS in order to further improve the MBMS channel performance. With this feature, when a 64 kbps MBMS channel is provided, the power used by the FACH can go from around 10% up to 20% of the total transmitted power as a function of the Transmission Time Interval (TTI), propagation channel condition, and number of radio links among which the combining is performed (2 or 3 radio links). However, even in this case the delivery of a 64 kbps MBMS requires a dedicated power of about 10-20% of the total transmitted power in a typical indoor environment. As a consequence, the standard solution requires a significant amount of power already needed for MBMS services limited in bit rate (0.1%-1% target BLER—radio BLock Error Ratio).

US 2003/0119452 proposes a method for controlling transmission power of a plurality of UEs by a Node B to perform broadcasting in a mobile communication system. In particular, the three different alternative approaches are described.

According to a first approach, the use of a new common channel is foreseen supporting MBMS and shared by all the MBMS users (named Physical Broadcast Multicast Shared CHannel—PMBSCH). Unlike the other channels, the PBMSCH transmits only pure MBMS data, and not control information. The PMBSCH is used in conjunction with another new channel, named CPCCH (Common Power Control CHannel) used for the power control of the PBMSCH. In case however the number of MBMS users in a certain cell is below a predetermined threshold, a number of DCHs equal to the number of users are allocated to deliver the MBMS contents.

A second approach proposed in the cited document tries to maximizes the efficiency of channelization code resources and transmission power resources by using a single DPDCH (Dedicated Physical Data CHannel) on the downlink for MBMS data transmission, N informal DPCCHs (Dedicated Physical Control CHannels) on the downlink for the transmission of signaling information to the UEs, and N DPCCHs on the uplink. The radio base station uses the N informal DPCCHs on the downlink for transmitting TPC (Transmit Power Control) commands to each single MBMS UE, instructing the UE to increase/decrease the transmission power of the uplink path according to the output of the power control algorithm run in the radio base station.

In a third embodiment proposed in the cited document, a separate power control for the N informal DPCCHs is guaranteed: the transmission power on each single informal DPCCH is dynamically calculated, and, on the basis of this calculation, and particular on the basis of the worst radio channels, the transmission power of the common DPDCH is calculated.

SUMMARY OF THE INVENTION

According to the Applicant, the solution proposed in the standard is inefficient and not satisfactory, under the transmission power control viewpoint.

Furthermore, the deployment of the solution according to the standard will require the development of completely new and very complex UEs, able to support MBMS services.

Moreover, the solution according to the 3GPP standard does not allow any retransmission, since no feedback channel is present, and the management of handovers is a hard task.

With respect to the solutions described in US 2003/0119452, the Applicant observes that the implementation of the first proposed approach implies a completely new radio frame structure (the two new channels PMBSCH and CPCCH need to be introduced); thus, both the network equipments and the UEs need to modified compared to those currently deployed.

In a similar way, the solution according to the second proposed approach has the drawback of introducing a completely new radio frame structure for the informal DPCCHs which are necessary for managing the power control problem of the uplink path; the frame structure of such informal DPCCHs is in fact completely different from the frame structure proposed by the UMTS standard. Thus, also in this case not only the network equipment needs to be changed, but also completely new, rather complex UEs should be introduced to support MBMS services. Moreover, the necessity of transmitting "over the air" the N informal DPCCHs causes a waste of CDMA codes and of downlink power resources; the N informal DPCCHs carry only the information for the power control command, then their power is controlled together with that of the common DPDCH; unnecessary transmission power waste can arise.

The third proposed embodiment presents similar limits as the second embodiment.

According to the Applicant, there is thus still a need of an efficient way for multicasting/broadcasting contents (particularly multimedia content) to a plurality of mobile users, exploiting P-T-M radio transmission, without causing significant changes in the currently available UEs. In particular, the Applicant has tackled the problem of improving the radio aspects of multicasting/broadcasting.

The Applicant has found that it is possible to efficiently multicasting/broadcasting contents to a plurality of users by adapting a dedicated channel so as to set a common downlink channel portion for the plurality of users, and an uplink channel portion dedicated to each user of the plurality. A power control algorithm can be efficiently implemented for a P-T-M radio transmission according to the above, for both the downlink and the uplink portions of the radio transmission.

In a first aspect, the invention relates to a method of distributing an information content to at least two user equipments.

The method comprises:

setting up a downlink channel being common to the at least two user equipments;

setting up at least two uplink channels, each uplink channel being dedicated to a respective one of said at least two user equipments;

delivering the information content to said at least two user equipments over said common downlink channel; and controlling transmission powers related to said common downlink channel and said at least two uplink channels in a closed-loop fashion, wherein said controlling transmission powers in a closed-loop fashion includes:

receiving from the at least two user equipments common downlink channel quality indications over the respective dedicated uplink channels;

adjusting a transmission power in respect of said common downlink channel based on the common downlink channel quality indications received from the user equipments;

evaluating a channel quality in respect of each of said at least two dedicated uplink channels, and based on the said evaluation, sending to the at least two user equipments a transmission power control command over the common downlink channel.

In preferred versions of the method of the present invention, said adjusting a transmission power in respect to said common downlink channel based on the common downlink channel quality indications received from the user equipments may include performing a statistical analysis of the common downlink channel quality indications received from the at least two user equipments, wherein said performing the statistical analysis may include:

increasing the transmission power with respect to the common downlink channel in case a number of received channel quality indications indicating a channel quality below a prescribed target quality exceeds a predetermined first threshold, wherein said performing the statistical analysis may include:

decreasing the transmission power in respect to the common downlink channel in case a number of received channel quality indications indicating a channel quality higher than or equal to a prescribed target quality exceeds a predetermined second threshold, and wherein said first threshold or said second threshold may be dependent on an overall number of said at least two user equipments.

In other preferred embodiments of the method of the present invention, said evaluating a channel quality in respect to each of said at least two dedicated uplink channels may include establishing an overall uplink channel quality based on the evaluated channel qualities of the at least two dedicated uplink channels;

said transmission power control command sent to the at least two user equipments over the common downlink channel may be commonly received by the at least two user equipments and may cause the at least two user equipments to vary in a same way a transmission power of the respective dedicated uplink channels;

said sending to the at least two user equipments a transmission power control command over the common downlink channel, based on said evaluation, may include:

ascertaining whether an overall interference power associated with said dedicated uplink channels exceeds a predetermined maximum interference power, and in the affirmative case, sending to the at least two user equipments a transmission power decrease command, adapted to instruct the at least two user equipments to decrease a transmission power with respect to the associated dedicated uplink channels;

said sending to the at least two user equipments a transmission power control command over the common downlink channel, based on said evaluation, may further include:

ascertaining whether at least one of said at least two dedicated uplink channels has an associated uplink channel quality lower than a predetermined minimum uplink channel quality, and in the affirmative case, sending to the at least two user equipments a transmission power increase command, adapted to instruct the at least two user equipments to increase a transmission power with respect to the associated dedicated uplink channels;

said sending to the at least two user equipments a transmission power control command over the common downlink channel, based on said evaluation, may further include:

ascertaining whether an overall number of dedicated uplink channels, among said at least two dedicated uplink channels, having an associated uplink channel quality exceeding said predetermined minimum uplink channel quality exceeds a predetermined third threshold, and in the affirmative case, sending to the at least two user equipments said transmission power decrease command, wherein said third threshold may depend on an overall number of said at least two user equipments; and said evaluating a channel quality in respect to each of said at least two dedicated uplink channels may further include:

defining a time window;

for each one of the at least two dedicated uplink channels, obtaining at least two uplink channel quality indications temporally-separated within said time window, wherein said uplink channel quality indications are obtained by comparison with a respective uplink channel quality threshold;

for each one of the at least two dedicated uplink channels, obtaining an average uplink channel quality indication from said at least two temporally-separated uplink channel quality indications; and obtaining an overall uplink channel quality based on the average uplink channel quality indications with respect to the at least two dedicated uplink channels, wherein said obtaining an average uplink channel quality indication may include:

calculating a number of temporally-separated uplink channel quality indications indicating that the uplink channel quality is higher than or equal to said uplink channel quality threshold;

ascertaining whether said number of temporally-separated uplink channel quality indications exceeds a predetermined fourth threshold; and in the affirmative case, having said average uplink channel quality indication indicate that the uplink channel quality is higher than or equal to said uplink channel quality threshold, wherein said obtaining an average uplink channel quality indication may further include:

ascertaining whether said number of temporally-separated uplink channel quality indications does not exceed a predetermined fifth threshold; and in the affirmative case, having said average uplink channel quality indication indicate that the uplink channel quality is lower than said uplink channel quality threshold, and wherein said obtaining an average uplink channel quality indication may further include:

having said average uplink channel quality indication indicate that the uplink channel quality is higher than or equal to said uplink channel quality threshold in case a number of more recent temporally-separated uplink channel quality indications indicating that the uplink channel quality is higher than or equal to said uplink channel quality threshold exceeds a predetermined sixth threshold.

Thanks to the solution according to the present invention, it possible to distribute information contents in a P-T-M way with a closed-loop power control, as in a P-T-P transmission; also, the impact on the complexity of the UEs is very limited and, in principle, only minor changes in the UEs' resident software/firmware are needed.

In a second aspect, the invention relates to a wireless communications network.

The wireless communications network comprises at least one radio transceiver station having an associated network cell and is adapted to enable radio communications with user equipments located in the network cell. The radio transceiver station is adapted to:

set up a common downlink channel in respect of at least two user equipments located in the network cell;

set up at least two dedicated uplink channels, each dedicated uplink channel being dedicated to a respective one of said at least two user equipments;

delivering an information content to said at least two user equipments over said common downlink channel;

receiving from the at least two user equipments common downlink channel quality indications over the respective dedicated uplink channels;

adjusting a transmission power in respect of said common downlink channel based on the common downlink channel quality indications received from the user equipments;

evaluating a channel quality related to each of said at least two dedicated uplink channels, and based on the said evaluation, sending to the at least two user equipments a transmission power control command over the common downlink channel.

In preferred embodiments of the wireless communications network of the present invention, said radio transceiver station may be adapted to adjust the transmission power with respect to said common downlink channel based on a statistical analysis of the common downlink channel quality indications received from the at least two user equipments, wherein said radio transceiver station may be adapted to:

increasing the transmission power with respect to the common downlink channel in case a number of received channel quality indications indicating a channel quality below a prescribed target quality exceeds a predetermined first threshold, wherein the radio transceiver stations may be adapted to:

decrease the transmission power with respect to the common downlink channel in case a number of received channel quality indications indicating a channel quality higher than or equal to a prescribed target quality exceeds' a predetermined second threshold, and wherein said first threshold or said second threshold are dependent on an overall number of said at least two user equipments.

In other embodiments of the wireless communications network of the present invention, the radio transceiver station may be adapted to establish an overall uplink channel quality based on the evaluated channel qualities of the at least two dedicated uplink channels;

said transmission power control command sent to the at least two user equipments over the common downlink channel may be commonly received by the at least two user equipments and causes the at least two user equipments to vary in a same way a transmission power of the respective dedicated uplink channels;

the radio transceiver stations may be adapted to:

ascertaining whether an overall interference power associated with said dedicated uplink channels exceeds a predetermined maximum interference power, and in the affirmative case, sending to the at least two user equipments a transmission power decrease command, adapted to instruct the at least two user equipments to decrease a transmission power with respect to the associated dedicated uplink channels;

the radio transceiver station may be adapted to:

ascertaining whether at least one of said at least two dedicated uplink channels has an associated uplink channel quality lower than a predetermined minimum uplink channel quality, and in the affirmative case, sending to the at least two user equipments a transmission power increase command, adapted to instruct the at least two user equipments to increase a transmission power with respect to the associated dedicated uplink channels; and the radio transceiver station may be adapted to:

ascertaining whether an overall number of dedicated uplink channels, among said at least two dedicated uplink channels, having an associated uplink channel quality exceeding said predetermined minimum uplink channel quality exceeds a predetermined third threshold, and in the affirmative case, sending to the at least two user equipments said transmission power decrease command, wherein said third threshold may depend on an overall number of said at least two user equipments.

In still other preferred embodiments of the wireless communications network according to the present invention, the radio transceiver station may be adapted to:

defining a time window;

for each one of the at least two dedicated uplink channels, obtaining at least two uplink channel quality indications temporally-separated within said time window, wherein said uplink channel quality indications are obtained by comparison with a respective uplink channel Quality threshold:

for each one of the at least two dedicated uplink channels, obtaining an average uplink channel quality indication from said at least two temporally-separated uplink channel quality indications; and obtaining an overall uplink channel quality based on the average uplink channel quality indications with respect to the at least two dedicated uplink channels, wherein the radio transceiver station may be adapted to:

calculating a number of temporally-separated uplink channel quality indications indicating that the uplink channel quality is higher than or equal to said uplink channel quality threshold;

ascertaining whether said number of temporally-separated uplink channel quality indications exceeds a predetermined fourth threshold; and in the affirmative case, having said average uplink channel quality indication indicates that the uplink channel quality is higher than or equal to said uplink channel quality threshold, wherein the radio transceiver station is adapted to:

ascertaining whether said number of temporally-separated uplink channel quality indications does not exceed a predetermined fifth threshold; and in the affirmative case, having said average uplink channel quality indication indicates that the uplink channel quality is lower than said uplink channel quality threshold, and wherein the radio transceiver station may be adapted to:

having said average uplink channel quality indication indicate that the uplink channel quality is higher than or equal to said uplink channel quality threshold in case a number of more recent temporally-separated uplink channel quality indications indicating that the uplink channel quality is higher than or equal to said uplink channel quality threshold exceeds a predetermined sixth threshold.

Features and advantages of the present invention will be made apparent by the following detailed description of preferred embodiments thereof, provided merely by way of non-limitative example, description that will be conducted with reference to the attached drawings.

DETAILED DESCRIPTION OF PREFERRED EMBODIMENTS OF THE INVENTION

Figure 1:
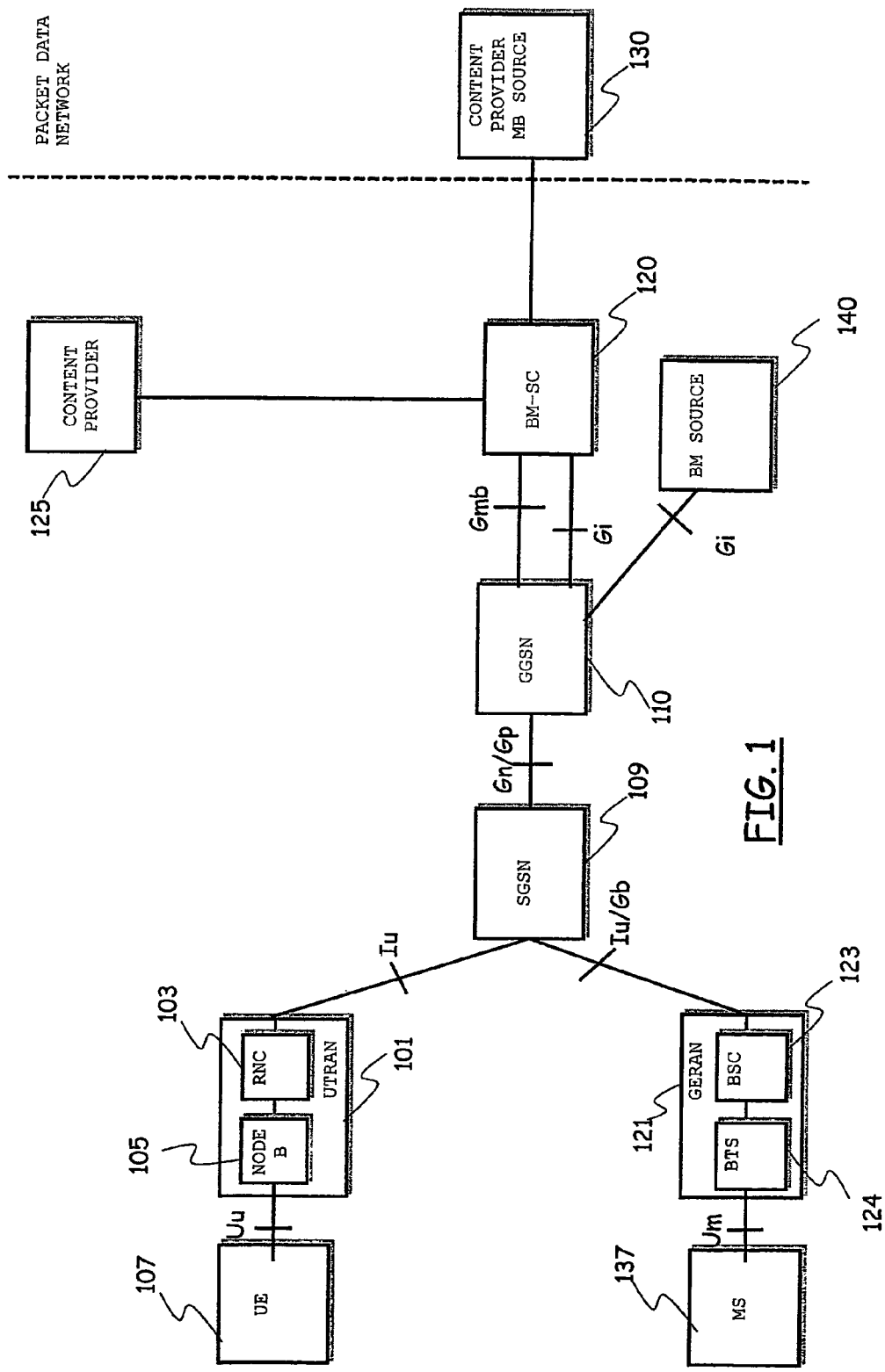
FIG. 1 schematically shows an exemplary UMTS network architecture adapted to support a MBMS service, according to an embodiment of the invention.

A 3G PLMN, particularly a UMTS network, as schematically shown in FIG. 1, comprises a number of logical elements, each one having a defined functionality. In the standard, network elements are defined at the logical level; however, this typically results in a similar physical implementation, since a number of open interfaces are defined in detail, so that the physical equipment at the endpoint can be provided by different manufacturers. The high-level system architecture of a UMTS network can be functionally grouped into (i) the UTRAN 101, that handles all the radio-related functionalities, and (ii) the CN (Core Network), which is responsible for switching and routing calls and data connections to external networks. The UTRAN 101 comprises in particular a RNC (Radio Network Controller) 103 controlling one or more radio transceiver station(s) or Node(s) B, like the Node B 105 in the drawing (in particular, it is assumed that the RNC 103 is the Controlling RNC—CRNC—for the Node B); each Node-B 105 is responsible for radio transmission in a predetermined area referred to as a "cell". To complete the system, UEs like the UE 107, interface with the user and the network radio interface. The UE 107 comprises a mobile equipment and a UMTS Subscriber Identity Module (USIM). The mobile equipment (typically a mobile phone) is used as the radio terminal for radio communication, whereas the USIM is typically a smartcard that carries the subscriber identity, performs algorithms for authentication of the subscriber in the network, stores authentication and encryption keys. The design of both the UE and the UTRAN is based on the specificities of the WCDMA radio technology; on the other hand, the structure of the CN is similar to that of 2G PLMNs like GSM networks; in particular, in a UMTS network supporting PS data communications, the CN is enriched with network elements making up a GPRS/EDGE infrastructure, particularly one or more SGSN (Serving GPRS Support Node) 109, and, possibly, one or more GGSN (Gateway GPRS Support Node) 110.

The network architecture of FIG. 1 also encompasses the existence, in addition to the UTRAN, which is typical of an UMTS network, a GERAN (GSM EDGE Radio Access Network) 121; the GERAN 121 has a structure similar to that of the UTRAN 101: however, in a GSM/GPRS context, the functions of the RNC are performed by a network function known as with BSCs (Base Station Controllers) 123 and the equipment responsible for radio transmission in a specific cell is typically known as BTSs (Base Transceiver Stations) 124.

The UMTS network of FIG. 1 is adapted to support MBMS. The MBMS is realized by the addition of a number of new capabilities to existing functional entities of the 3GPP architecture, and by addition of a number of new functional entities. In order to provide MBMS bearer services, some functional entities of the UMTS network, particularly the PS-domain entities such as the GGSN 110, the SGSN 107, and the RNC 103 (similarly, the BSCs 123), are enhanced to perform several MBMS-related functions and procedures, some of which are specific to MBMS. Specific functional entities, such as a Broadcast Multicast Service Centre (BM-SC) 120, may be also provided in the UMTS network for the provisioning of the MBMS services.

In FIG. 1 different interfaces, identified as Uu, Um, Iu, Gb, Gn, Gp, Gmb, Gi, between the various functional entities of the network are also identified. As explained above, such "open" interfaces allow a network operator to build a network with equipment originated from different manufacturers with reduced compatibility issues.

More particularly, with reference to FIG. 1, the BM-SC 120 provides a set of functions for MBMS service provisioning and delivery. It may serve as an entry point for MBMS transmissions of information contents provided by a source of information contents, such as a Content Provider (CP) 125 within the network. Typically, the BM-SC 120 is also used to authorize and initiate MBMS bearer services within the PLMN, and can be used to schedule and deliver MBMS transmissions. Furthermore, it can be connected, through a packet-domain network (PDN), for example the Internet, to one or more external Content Provider/Broadcast Multicast Servers (CP/BM-S), like the CP/BM-S 130, providing information contents to be transmitted via MBMS to the UEs, as well as to Mobile Stations (MSs, a terminology for a mobile communication terminal typically adopted in a GSM/GPRS context) of users connected to the GERAN, like the MS 137 in the drawing.

The BM-SC 120 is able to provide the UEs (or the MSs) with the information contents using MBMS delivery services, and it may schedule MBMS session transmissions, as well as label each MBMS session with an MBMS session identifier to allow the UEs/MSs distinguishing the MBMS session transmissions. Service announcements for multicast and broadcast MBMS user services, as well as media descriptions specifying the media to be delivered as part of an MBMS user service (e.g. type of video and audio encodings), can be also provided by the BM-SC. Furthermore, the BM-SC may be able to provide the UEs/MSs with MBMS session descriptions specifying the MBMS sessions to be delivered as part of an MBMS user service (e.g., multicast service identification, addressing, time of transmission, etc.)

The generic UE 107 supports functions for the activation/deactivation of the MBMS delivery service. Once a particular MBMS delivery service is activated, no further explicit user request should be required to receive MBMS data, although the user may be notified that data transfer is about to start. Also, the UE may, depending on the terminal capabilities, be able to receive MBMS delivery service announcements, paging information or support simultaneous services. For example the user can originate or receive a call or send and receive messages whilst receiving MBMS video content. Similar or identical functions are also performed by the generic MS.

The UTRAN 101 (similar actions are performed by the GERAN 121) is responsible for efficiently delivering MBMS information content (data) to the UEs camping into a designated MBMS service area. MBMS data are received by the UTRAN 101 in a single copy for all the mobile users that requested the service. Also, the UTRAN 101 may be able to transmit MBMS user service announcements, paging information and support other services in parallel with MBMS, for allowing users having appropriate equipment capability to originate, or receive a call, or send, or receive messages whilst receiving MBMS video content.

The SGSN 109 performs user-specific MBMS delivery service control functions and provides MBMS transmissions to the UTRAN 101 (and to the GERAN 121). The SGSN 109 may be also able to generate billing data per multicast MBMS delivery service for each user. The SGSN 109 may be able to establish Iu and Gn bearers shared by many users on demand when MBMS data has to be transmitted to the users. This can be done upon notification from the GGSN 110. Likewise, when data is no longer available, the SGSN 109 may be able to tear down these Iu and Gn bearers upon notification from the GGSN 110.

The GGSN 110 serves as an entry point for multicast traffic as MBMS data. Upon notification from the BM-SC 120, the GGSN 110 may be able to request the establishment of a bearer towards the SGSN for a broadcast or multicast MBMS transmission. Further, upon notification from the BM-SC 120, the GGSN 110 may be able to tear down the established bearer. In particular, bearer establishment for multicast services is carried out towards those SGSNs 109 that have requested to receive transmissions for the specific multicast MBMS bearer service.

The GGSN 110 may be able to receive multicast traffic (whether from the BM-SC 120, or from other information contents sources, such as a Broadcast/Multicast Source— BM-S—140, internal to the network) and to route this data to the proper GTP (GPRS Tunnel Protocol) tunnels set-up as part of the MBMS bearer service.

According to the 3GPP standard, the MBMS is a service in which data are transmitted from a single entity—the source— to multiple recipients. Transmitting the same data to multiple recipients allows network resources to be shared, and thus saved. The MBMS delivery service offers two modes: broadcast mode and multicast mode.

In the so-called "bearer plane", the MBMS provides delivery of IP multicast datagrams from the Gi interface reference point to UEs (or MSs) with a specified Quality of Service (QoS). In the so-called "control plane", the MBMS provides mechanisms for: managing the MBMS delivery service activation status of the UEs (or the MSs), in the case of multicast mode; outsourcing (to the BM-SC) the authorization decisions to the MBMS user service, in the case of multicast mode; and providing control of session initiation/termination by the MBMS user service and managing delivery resources for the distribution of MBMS data.

A particular instance of an MBMS delivery service may be identified by an IP multicast address, and possibly by an APN (Access Point Name) network identifier. The boundary of the MBMS delivery service are the Gmb and Gi interface reference points (between the GGSN and the BM-SC): the former provides access to the control plane functions, whereas the latter provides access to the function of the bearer plane.

Signaling between the GGSN 110 and the BM-SC 120 is exchanged at the Gmb interface reference point, which represents the operator network-side boundary of the MBMS bearer service from a control plane perspective. The exchanged signaling includes MBMS bearer service-specific Gmb signaling, and user-specific Gmb signaling. MBMS bearer service-specific Gmb signaling includes the following signalings: the GGSN 110 establishes the MBMS bearer context and registers at BM-SC 120; the GGSN 110 or the BM-SC 120 releases the MBMS bearer context and de-register the GGSN 110 from the BM-SC 120; the BM-SC 120 indicates session start and stop to the GGSN 110, including session attributes like QoS or MBMS service area. User-specific Gmb signaling includes in turn the following signalings: the BM-SC 120 authorizes the user-specific MBMS multicast service activation (join) at the GGSN 110; the GGSN 110 reports to the BM-SC 120 the successful user-specific MBMS multicast activation (join) to allow the BM-SC 120 for synchronizing the BM-SC UE MBMS context and charging with the MBMS UE contexts in the SGSN 109 and GGSN 110; the GGSN 110 reports to the BM-SC 120 when a user-specific MBMS multicast service is released or deactivated (e.g., when the radio contact is lost) to synchronize the BM-SC UE MBMS contexts and charging with the MBMS UE contexts in SGSN 109 and GGSN 110.

The BM-SC initiates the deactivation of a user-specific MBMS delivery service when the MBMS user service is terminated.

It is observed that the BM-SC functions for different MBMS delivery services may be provided by different physical network elements. Further, MBMS delivery service-specific and user-specific signaling for a same MBMS delivery service may also be provided by different physical network elements. To allow this distribution of BM-SC functions, the Gmb protocol supports the use of proxies to correctly route the different signalings in a manner which is transparent to the GGSN.

Hereinafter, a description of how a MBMS service is provisioned to the users is provided. The description that will be made will not enter into excessive details, well-known to those skilled in the art, and available in the 3GPP standard. First, the provision of an MBMS user service in multicast mode is considered, followed by a brief discussion of the provision of an MBMS service in broadcast mode.

The reception of MBMS information contents delivered in multicast mode is enabled by procedures exemplarily including, roughly in sequence, a subscription phase, a service announcement phase, a joining phase, a session start phase, an MBMS notification phase, a data transfer phase, a session stop phase and a leaving phase. The subscription, joining and leaving phases are performed individually for each user. The other phases are performed for an MBMS service as a whole, i.e., for all users interested in that service. The sequence of phases may be repeated, e.g. depending on the need to transfer data. Also, the subscription, joining, leaving, service announcement and MBMS notification phases may run in parallel to other phases, for other users that wish to benefit of the MBMS service.

In the subscription phase, the relationship between the user and the service provider is established, allowing the user to receive the related MBMS multicast service. In this phase the user agrees to receive specific MBMS service(s) offered and made available by the mobile telephony network operator. Subscription information is recorded in the appropriate database(s) in the operator's network.

In the service announcement phase, MBMS user service announcement/discovery mechanisms allow users to request or be informed about the range of MBMS user services available; these services may include network operator-specific MBMS user services (provided for example by the network-internal BM-S 140) as well as services from content providers outside of the PLMN (like the content provider 130). The service announcement is used to distribute to users information about the service, parameters required for service activation (e.g. IP multicast address) and possibly other service-related parameters (e.g. service start time). Several service discovery mechanisms may be adopted, including standard mechanisms such as SMS, or, depending on the capability of the terminal, applications that encourage user interrogation.

It is observed that the service subscription and the service announcement phases are not temporally linked to each other: the service subscription phase can take place at any time before or after the service announcement phase.

In the joining phase (i.e., activation of the MBMS multicast mode reception by the user) a subscriber joins (i.e., becomes a member of) a multicast group: the user indicates to the network that he/she is willing to receive multicast-mode data related to a specific MBMS bearer service.

The session start takes place when the BM-SC 120 is ready to send data in respect to that specific MBMS service; it is observed that the session start is independent from the activation (join) of the service by the users, i.e., a generic user may activate the MBMS service either before or after the related session start. The session start triggers the establishment of the resources for MBMS data delivery.

The service announcement may contain a schedule of session start times, and may be sent some time before the service is due to start. So, the period between the service announcement and the session start may amount to hours, days or even weeks. In particular, some MBMS delivery services may be 'always on': in this case, the joining phase may take place immediately after the service announcement and, possibly, many hours before, or after, the session start. In other cases, if a session start time is known, the joining may take place immediately before the session start, or thereafter. For these services, the service announcement may contain some indication of a time period within which users should choose a time to join the MBMS bearer service.

In the MBMS notification phase, the UEs are informed of the forthcoming (or already ongoing) MBMS multicast data delivery.

The data transfer is the phase in which MBMS data are transferred, i.e. delivered to the UEs. Concerning the time lapsing between the session start and the arrival of the first data, the session start indicates that the transmission is about to start; the time delay between a session start indication and the actual arrival of data should be long enough for the network actions required at session start to take place, e.g. provision of service information to the UTRAN 101, for the establishment of the radio bearers. The session start may be triggered by an explicit notification from the BM-SC 120.

The session stop takes place when the BM-SC 120 ascertains that are no more data to send for some period of time (a period being long enough to justify removal of data delivery resources associated with the session). As a result of the session stop, the MBMS delivery resources are released. When the BM-SC recognizes that there are no more data to be sent for a "long idle period", it decrees a session stop to the network, causing the release of data delivery resources. However, if this idle period with no data is short, this may not be appropriate as it brings more signaling and processing.

The leaving, or MBMS multicast deactivation by the user, is the process by which a subscriber leaves (i.e., ceases being a member of) a multicast group, i.e., the user no longer wants to receive multicast mode data of a specific MBMS service.

The phases involved in the provision of a broadcast-mode MBMS are a subset of those described in connection with the MBMS multicast service, and include the subscription phase, the service announcement phase, the joining phase, the session start phase, the MBMS notification phase, the data transfer phase, the session stop phase and the leaving phase. The sequence of phases may be repeated, e.g. depending on the need to transfer data. It is also possible that the service announcement and MBMS notification phases may run in parallel with other phases, in order to inform UEs which have not yet received the related service.

Whenever a new user wishes to enjoy an MBMS service, the user activates the service following the architecture and the procedures foreseen and described by the 3GPP standard; summarizing, after the service activation and the session start, the competent RNC (i.e., the RNC competent for the area in which that user is currently located, like the RNC 103 for the UE 107) sets up a RAB (Radio Access Bearer) over the radio interface, in order to support the delivery of the information contents related to the MBMS service.

In accordance with the details described in 3GPP TS 25.346 V.6.4.0, from the radio protocol point of view, the generic C-RNC which is controlling one or more network cells within an MBMS service area, like the C-RNC 103 in the drawing, maintains an MBMS service context for each MBMS service. Each C-RNC MBMS service context is associated with an MBMS service identifier. Also, the C-RNC MBMS service context contains a list of UEs which are in the so-called PMM connected mode (where PMM is an acronym for Packet Mobility Management) which are present in the cell(s) under competence of the C-RNC, and which have activated the MBMS service, and/or a list of URAs (UMTS Routing Areas).

The MBMS session start and session stop procedures serve to establish and release the MBMS Iu signaling connection.

In the MBMS session start and MBMS session stop phases, the RNC receives a respective request from the core network. The MBMS session start request contains the MBMS service identifier, the MBMS delivery service type and the MBMS session attributes (MBMS service area information, QoS parameters, and the like). The MBMS session start request causes the RNC to notify the UEs, which have activated the MBMS service of the MBMS session start. The MBMS session stop request may cause the RNC to notify the UEs which have activated the MBMS service of the MBMS session stop.

The MBMS session start and session stop procedures determine the setup and release of the MBMS RAB. In particular, the MBMS session start request contains all information necessary to setup an MBMS RAB. When the generic RNC receives an MBMS session start request, it typically performs an MBMS Iu data bearer set up, and, in an MBMS session start response message, it informs the core network node that sent the request about the set up outcome. When the generic RNC receives an MBMS session stop request, it releases the associated MBMS RAB resources.

As far as an MBMS P-T-M delivery service is concerned, the generic UE may be in any one of the following states:

state 1 ("not active"): the UE has not joined any MBMS multicast service, or it has not activated the broadcast mode of the MBMS;

state 2 ("not active"): the UE has joined at least one MBMS service and/or it has activated the broadcast mode of the MBMS, but no MBMS system information is broadcasted in the cell on the BCCH (Broadcast Control Channel). By MBMS system information there is intended a signaling flow used in the UTRAN to broadcast MBMS system information to UEs using the BCCH (Broadcast Control CHannel) logical channel. The MBMS system information shall be repeatedly transmitted after its first transmission. Upon receiving the first MBMS system information, the generic UE establishes the radio bearer carrying an MCCH (MBMS P-T-M Control Channel): the MBMS system information includes MCCH schedule information (access information, repetition and modification periods) and the information for the configuration of a radio bearer carrying an MCCH;

state 3 ("active"): the UE has joined at least one MBMS multicast service and/or it has activated the broadcast mode of the MBMS, but none of the MBMSs that UE has joined (or broadcast-mode MBMSs) is being transmitted; the UE monitors the MICH (MBMS notification Indicator Channel); the MICH is an MBMS-specific PICH (Paging Indication Channel) channel used to carry MBMS notification indicators, particularly for notifying the UEs of an upcoming change in critical MCCH information. Notifications are based on service groups; a single MICH frame is adapted to carry notification indications for every service-group.

state 4 ("active"): at least one MBMS multicast service which the UE has joined (or broadcast-mode MBMSs) is transmitted in P-T-M; in this state two different cases are possible: the UE may be receiving MBMS transmission, or the UE may be using a Discontinuous Reception (DRX) mechanism, based on scheduling information informing that coming transmission is not in the interest of the UE.

When an MBMS transmission is started in the generic network cell, the UEs of that cell that are in the active state move from state 3 to state 4; after the MBMS transmission ends, those UE moves back from state 4 to state 3.

As mentioned in the foregoing, the standard provides for (in respect of UEs that are in the active state) two different ways of MBMS data distribution: P-T-P transmission, exploiting one DCH for each UE involved in the MBMS service, and P-T-M transmission, using one common channel for MBMS data delivery to all the UEs involved in the MBMS service. For the purposes of the present invention, the P-T-M way of transmission is taken into account; however, it is pointed out that the present invention allows maintaining the possibility for the network operator to select which mode, P-T-P or P-T-M, adopt for distributing a particular MBMS, based for example on the number of UEs that, at a given time, have to receive the service.

As mentioned in the introductory part of the present description, the standard radio framework for supporting P-T-M MBMS services also provides for the use of the three logical channels MCCH, MSCH and MTCH.

According to an embodiment of the present invention, the MSCH and the MCCH logic channels, i.e. those channels that are used for delivering control and scheduling information, not MBMS data) are mapped onto a conventional FACH transport channel (i.e., one the FACH channels foreseen in the R99 of the standard), whereas the MTCH, i.e. the logic channel that transports the P-T-M MBMS service data, is mapped onto a transport channel having a structure similar to that of a conventional DCH transport channel, particularly, according to an embodiment of the present invention, the MTCH is mapped onto a transport DCH, hereinafter also referred to as MDCH (MBMS DCH). In particular, from a protocol point of view, the transport channel used for the delivery of MBMS service data corresponds to a normal DCH as foreseen by the R99 of the standard: thus, all the radio protocols implemented in the UE for the management, set up and release of the MDCH are advantageously the same of a normal DCH. Also, from the network point of view, all the protocols for the management, set up and release of the MDCH remain the same as those for a generic DCH, with the exception of specific power control procedures, according to an embodiment of the present invention, which will be described in this document.

In greater detail, according to an embodiment of the present invention, after a first phase in which the MBMS service is set up, the UTRAN allocates on the downlink, for all the UEs involved in the MBMS service, a single channel, which is used in common by all the users who asked that MBMS service, e.g. a common DCH (the MDCH referred to above); on the uplink, the UTRAN allocates instead a dedicated channel, e.g. a DCH, for each UE involved in the MBMS service.

In greater detail, whenever a user asks for an MBMS service, he/she has to set up a signaling connection between his/her UE and the UTRAN: after a RACH (Random Access CHannel) access, the UTRAN allocates for that UE a pair of dedicated transport channels, particularly a pair of DCHs, one for the uplink and one for the downlink. In particular, both on the uplink and on the downlink, the RRC signaling is carried over a DCCH (Dedicated Control CHannel), which is a logical channel mapped onto the DCH, the latter being in turn mapped onto a DPDCH (Dedicated Physical Data CHannel), a physical channel having associated therewith a DPCCH (Dedicated Physical Data CHannel). During the set up of the signaling, the UE and the UTRAN execute fast power control algorithms on both the uplink and downlink; the power control algorithms converge to the proper transmission power on the uplink and downlink, depending on the propagation channel conditions and thus on the location of each user in the service area When the application layer of the UE asks for an MBMS service, in accordance with the chosen service architecture, a request is sent to the UTRAN for the set up of a proper MBMS radio bearer. When the UTRAN receives such request from the UE, the RNC carries out a radio access bearer re-allocation; the RNC performs such a radio access bearer re-allocation for all the UEs of the users who asked for that MBMS service.

In particular, as far as the uplink is concerned, for each UE the same dedicated channel allocation used for the signaling set up is maintained; in other words, the UE-specific uplink DCHs are maintained. On the downlink the UTRAN assigns instead the same DCH (and thus, at the physical level, the same pair of DPDCH and DPCCH) to all the UEs involved in the MBMS service: thus, on the downlink all the users share the same channel. Considering the generic network cell, the UTRAN allocates on the uplink a number of DCHs (i.e., a number of physical channels pairs DPDCH and DPCCH) equal to the number of UEs in that cell that are involved in the MBMS service, whereas on the downlink only one channel is allocated (i.e., only one pair of physical channels DPDCH and DPCCH) for the particular MBMS service.

The way the UTRAN re-allocates the downlink channels is described in the following.

According to an embodiment of the present invention, the MBMS service is provided in a way coherent with the 3GPP standard. In particular, MCCH information is transmitted based on a fixed time schedule, identifying the Transmission Time Interval (TTI) containing the beginning of the MCCH information. The MCCH information includes critical and non-critical information; critical MCCH information includes MBMS neighboring cell information, MBMS service information and MBMS radio bearer information. The non-critical MCCH information corresponds to MBMS access information.

The transmission of the MCCH information may take a variable number of TTIs, and the UTRAN transmits MCCH information in consecutive TTIs. The generic UE keeps on receiving the MDCH until it receives all of the MCCH information, or it receives a TTI that does not include any MCCH data, or the information contents indicate that further reception is not required (e.g., no modification to the desired service information). The UTRAN may resend the MCCH information following a scheduled transmission in order to improve reliability.

Considering non-critical MCCH information, the MBMS access information is used in a proper signaling flow for handling MBMS UEs in idle mode, so that the RNC can inform the UE(s) interested in a particular MBMS service of the potential need to establish an RRC connection. The MBMS access information includes an MBMS service identifier for each service for which counting is required, and an associated access "probability factor".

Concerning critical MCCH information, the MBMS neighboring cell information and the related signaling flow is exploited for handling MBMS to UEs in PMM idle and connected modes. The MBMS neighboring cell information signaling flow allows the UTRAN to inform the UEs of the MTCH configuration of the neighboring cells which are available, for instance, for selective combining. With the MBMS neighboring cell information the generic UE is put in conditions of receiving MTCH transmission from neighboring cells without the reception of the MCCH of that neighboring cell. The MBMS neighboring cell information is preferably repeatedly transmitted on the MCCH when selective combining is utilized in the MBMS P-T-M transmission in a given group of cells.

The MBMS service information contains MBMS service identifiers and the indication that the MBMS service is delivered in P-T-M. The MBMS service identifiers indicate the MBMS services which are being served in the cell, or the MBMS services which can be served if the UEs request them. The P-T-M indication indicates that the MBMS service is delivered on P-T-M in that cell, thereby informing the UEs of the need of reception of the MBMS radio bearer information. The MBMS radio bearer information is only available for P-T-M transmission, and includes the MBMS service identifier, the MBMS UTRAN cell group identifier, logical channel, transport channel and physical channel information in respect of the MBMS service; the MBMS UTRAN cell group identifier is used to indicate to the UEs which MBMS cell group the generic cell pertains to.

The entire MCCH information is transmitted periodically, based on a "repetition period". A "modification period" is defined as an integer multiple of the repetition period. The MBMS access information may be transmitted periodically, based on an "access information period", which may be an integer divider of the "repetition period".

Changes to the critical information are only applied at the first MCCH transmission of a modification period; changes to non-critical information could take place at any time. At the beginning of each modification period the UTRAN transmits the MBMS change information, including MBMS services identifiers whose MCCH information is modified at that modification period. The MBMS change information is repeated at least once in each repetition period of that modification period.

In particular, an MBMS notification mechanism is used to inform the UEs of an upcoming change in critical MCCH information. Notifications are based on service identifiers and service groups. According to an embodiment of the present invention, this procedure differs from the one foreseen by the standard.

According to the standard, an MBMS notification is sent on the MICH channel and uses a NI (Notification Indicator) parameter; as an alternative the standard provides for the use of the SCCPCH (Secondary Common Control Physical CHannel) carrying the MTCH, or even of the SCCPCH carrying the MCCH. Thus the UTRAN, according to the standard, may use in-band notification instead of the MICH to notify users receiving MTCH.

According to an embodiment of the present invention, the MBMS NI parameters are sent on a normal PICH (Paging Indicator CHannel), a physical channel already used in the UMTS (as foreseen in the R99 of the standard). The MBMS NI parameters are paging information that carries an identifier common to all those MBMS users who subscribed and/or joined the same MBMS service. The PICH is a fixed-rate physical channel used to carry the Paging Indicators (PIs). The PICH is always associated with an SCCPCH onto which a transport PCH (Paging CHannel) is mapped. Furthermore, the higher layers associate the PIs and the UE with the value of the PI. If a PI in a certain frame is set to "1", it is an indication that UEs associated with such PI should read the corresponding frame of the associated SCCPCH.

Alternatively, an MBMS NI parameter may be defined by using a predetermined PI, one MBMS PI for every MBMS service. In this case, the higher layers associate, to all the UEs that have registered and/or joined a certain MBMS service, the same and unique PI that is used as an NI parameter in the MBMS standard framework.

As a further alternative, a common NI is not defined, as foreseen by the standard, but on the other hand the UTRAN transmits N different PIs on the PICH in order to address all the UEs who have joined/subscribed the same MBMS service. In both cases, as a result the UEs read the corresponding frame associated with the MCCH mapped onto the normal UMTS R99 FACH transport channel and normal UMTS R99 SCPCCH.

The MBMS NIs or PIs corresponding to the UEs that chose a certain MBMS service are set continuously during the entire modification period of the MCCH information, preceding the first change in MCCH information related to a given service. Subsequent changes in the MCCH information in the next modification period related to the same service can be signaled on the MCCH.

Upon detecting the MBMS NI for a service group, the UEs interested in a service corresponding to this group start reading the MCCH at the beginning of the next modification period. The generic UE reads at least the MBMS change information.

UEs which are receiving MBMS service(s) on MTCH in idle mode or in the other proper RRC states foreseen by the standard (URA_PCH, CELL_PCH or CELL_FACH, as specified in the 3GPP TS 25.331) read the MCCH at the beginning of each modification period, so as to receive the MBMS change information, which indicate MBMS service identifiers and, optionally, MBMS session identifiers whose MCCH information is modified at that modification period. If MBMS service identifier and, optionally, MBMS session identifier, which UE has activated, is indicated in the MBMS change information, the generic UE read the remaining of the MCCH information.

Upon receiving a session start indication from the core network, the UTRAN initiates the session start sequence to allocate radio resources to the UEs for delivering the MBMS contents. As part of this sequence, the UTRAN may apply a counting procedure directed to counting the number of UEs in idle mode, to determine the optimum transmission mechanism (P-T-P or P-T-M) for a given service. In general, the session start sequence involves the steps briefly described in the following.

In case the UTRAN applies the counting procedure to determine the optimal transfer mode, the following steps are performed:

1. the UTRAN sets the correct MBMS NI and sends the MBMS change information and the MBMS access information including the service identifier, the session identifier (if received from the core network), and the access probability on MCCH;

2. upon DRX wakeup, the UEs in idle mode, as well as the UEs in CELL_PCH, URA_PCH and CELL_FACH which are not receiving an MBMS service, evaluate the MBMS NI or the PI and, if set, read the MBMS change information from the MCCH at beginning of the modification period. The UEs in idle mode, as well as the UEs in CELL_PCH, URA_PCH and CELL_FACH receiving an MBMS service, read the MBMS change information directly. If the service identifier of activated MBMS service and session identifier that the UE has not received is indicated in MBMS change information, the UEs continue reading the remaining of the MCCH information. Upon receiving the MBMS access information, including the access probability, the UEs in idle mode or URA_PCH state for which the probability check is passed, initiate an RRC connection establishment to pass to the PMM connected mode, or perform a cell update procedure, respectively. UEs in CELL_PCH or CELL_FACH state ignore the MBMS access information. The UTRAN counts the UEs interested in the MBMS service using UE linking from CN;

3. if no UE is counted as present in the cell, the UTRAN may decide not to provide any radio bearer for the service in the cell;

4. the UTRAN configures the MTCH and updates the MCCH (adding the MBMS service information and the MBMS radio bearer information) by including the service identifier, the session identifier (if received from the core network), and P-T-M radio bearer information for the concerned MBMS service;

5. the UTRAN sends the MBMS dedicated notification message including the service identifier, and causes the session start on DCCH to inform the UEs in the CELL_DCH that are not receiving an MBMS service provided using P-T-M transfer mode;

6. the UEs read the MCCH at the predefined time(s), to acquire the MBMS service information and the MBMS radio bearer information.

In case the establishment of P-T-M radio bearer is not preceded by counting, the UTRAN sets the correct MBMS NI or PIs and sends MBMS change information; upon DRX wakeup, UEs not receiving MTCH evaluate the MBMS NI or PIs and, if set, they read the MCCH at beginning of the modification period to acquire the MBMS change information.

The UEs in idle mode, as well as UEs in CELL_PCH, URA_PCH and CELL_FACH receiving an MBMS service read the MBMS change information directly. If the service identifier of the activated MBMS service and the session identifier that the generic UE has not received is indicated in the MBMS change information, the UE continues reading the rest of the MCCH information to acquire the MBMS service information and the MBMS radio bearer information.

Those UEs that are incapable of receiving the MTCH for the session that is started in parallel to the existing activity notify the user. This enables the user to choose between the ongoing activity and the new MBMS service.

Upon receiving an MBMS dedicated notification with cause equal to session start, UEs in CELL_DCH mode that are incapable of receiving the MCCH and the corresponding MTCH in parallel to the existing activity notify the user. This enables the user to choose between the ongoing activity and the new MBMS service. If the user decides to receive the new MBMS service, the UE shall read the MCCH to acquire the MBMS service information and the MBMS radio bearer information. Optionally, according to an embodiment of the present invention, in the case in which the UE is able to support multicode transmission onto the physical layer the network could decide to continue the support of the current UE activity adding the radio bearer for the support of the MBMS service.

Upon receiving the MBMS service information and the MBMS radio bearer information including the P-T-M radio bearer information for the concerned MBMS service, the generic UE starts receiving the P-T-M radio bearers.

The RAB establishment for MBMS data transmission is now described.

The RNC includes an RRM (Radio Resource Management) function comprising a set of protocols for the implementation of functions directed to efficiently manage radio resources. Inside the RRM, the radio access network has knowledge of all the MBMS users, in accordance to the MBMS context received by the core network (i.e., by the SGSN) and present in the RNC. In particular, the MBMS service context in the C-RNC contains a list of PMM UEs which are present in one or several cells of the CRNC, and which have activated the MBMS service, and/or a list of URAs in which there is at least one URA_PCH UE which has activated the MBMS service. The list includes at least the U-RNTI of the UEs in the state other than URA_PCH and/or URA-IDs. No information about UEs in RRC idle mode are included in the list: the information about UEs in RRC idle mode can be collected thanks to the counting procedure.

The RRM maintains the identification of each single user by means of a logical identifier in the MAC layer, that is responsible for the mapping of the MTCH onto the MDCH.

According to an embodiment of the present invention, from the radio channel point of view, the RRM allocates only one. DCH transport channel, mapped onto one DPDCH (Dedicated Physical Data CHannel), on the downlink. In this way, only one single CDMA code on the downlink is allocated over the air interface for the distribution of the MBMS contents. On the other hand, on the uplink each UE has its own dedicated channel. This architecture allows the complete identification of every single UE, since the network is aware of the user identity on both the uplink (on the downlink, the generic UE can be identified at the MAC layer).

Since the MTCH is mapped onto the MDCH, which behaves as a conventional DCH, the bit rate may be adapted to the real capacity usage. Let it be supposed that the mobile network operator decides to allocate a certain percentage of OVSF (Orthogonal Variable Spreading Factor) codes on the downlink for the MBMS services; let C denote the total capacity in terms of total bit/seconds; for instance, let it be assumed that C is equal to 2 Mbit/sec. Let it also be supposed that the mobile network operator provides a maximum number N, for example 6 simultaneous MBMS services. In this case, N MDCHs are allocated, with a bit rate equal to 64 kbps. If the RNC determines, by means of the MBMS service context and/or counting procedure, that in the cell there are UEs interested in just a subset, for example of 3 of the 6 possible MBMS services, the RNC can reconfigure the MDCHs, increasing the bit rate associated to each single MDCH up to 384 kbps. In this way, the choice of mapping the MTCH over a MDCH enables an architecture able to exploit the best quality in the capacity boundaries set by the operator.

Another advantage of using MDCHs for the delivery of MBMS information contents is that a closed-loop power control may be implemented both in downlink and in uplink, in manner similar to that of a conventional DCH. In particular, but without descending into excessive details per-se known to those skilled in the art, being part of the standard related to DCH, on the downlink the generic UE continuously monitors the quality of the downlink radio channel; for example, to this purpose a parameter known as the SIR (Signal to Interference power ratio) is exploited: the generic UE estimates the SIR of the downlink radio channel (methods for estimating the SIR are known in the art, and will thus not be described in detail), and compares the estimated SIR $SIR_{est}$ to a target SIR $SIR_{target}$, a parameter established for a given service and which can be estimated in the UE starting from the BLER target parameter typically communicated by the UTRAN to the UE. If the estimated SIR $SIR_{est}$ is higher than the target SIR $SIR_{target}$, the UE sends to the UTRAN a TPC (Transmit Power Control) command, directed to inform the network of the necessity of decreasing the transmission power on the downlink; otherwise, if the estimated SIR $SIR_{est}$ is lower than or equal to the target SIR $SIR_{target}$, the UE sends to the UTRAN a TPC command directed to inform the network of the necessity of increasing the transmission power on the downlink. In particular, a TPC command equal to "0" informs the network of the necessity of decreasing the power, whereas a TPC command equal to "1" informs the network of the necessity of increasing the transmission power. Responsive to the TPC command, the UTRAN (particularly, the Node B) either increases or decreases the transmission power. This procedure typically takes place according to a fixed time schedule; according to the standard this may happen every 0.625 ms, following the so called downlink power control mode 0 (DPC_MODE=0). In other words, every 0.625 ms the generic UE performs the control of the SIR and sends to the network the TPC command in the first available TPC field in the uplink DPCCH. Alternatively, the standard provides for another procedure in which the power control if performed every 3 time slot (3*0.625 ms), following the so called downlink power control mode 1 (DPC_MODE=1). In this case the UE repeats the same TPC command over 3 time slots and the new TPC command is transmitted such that there is a new command at the beginning of the frame. The UE generates TPC commands to control the network transmit power and send them in the TPC field of the uplink DPCCH. The UE checks the downlink power control mode (DPC_MODE) before generating the TPC command and the UE adopts one of the two behaviors described above as a function of the DPC_MODE parameter. Similar actions may be performed by the UTRAN, in respect of the uplink DCH channel associated with the generic UE.

Figure 2:
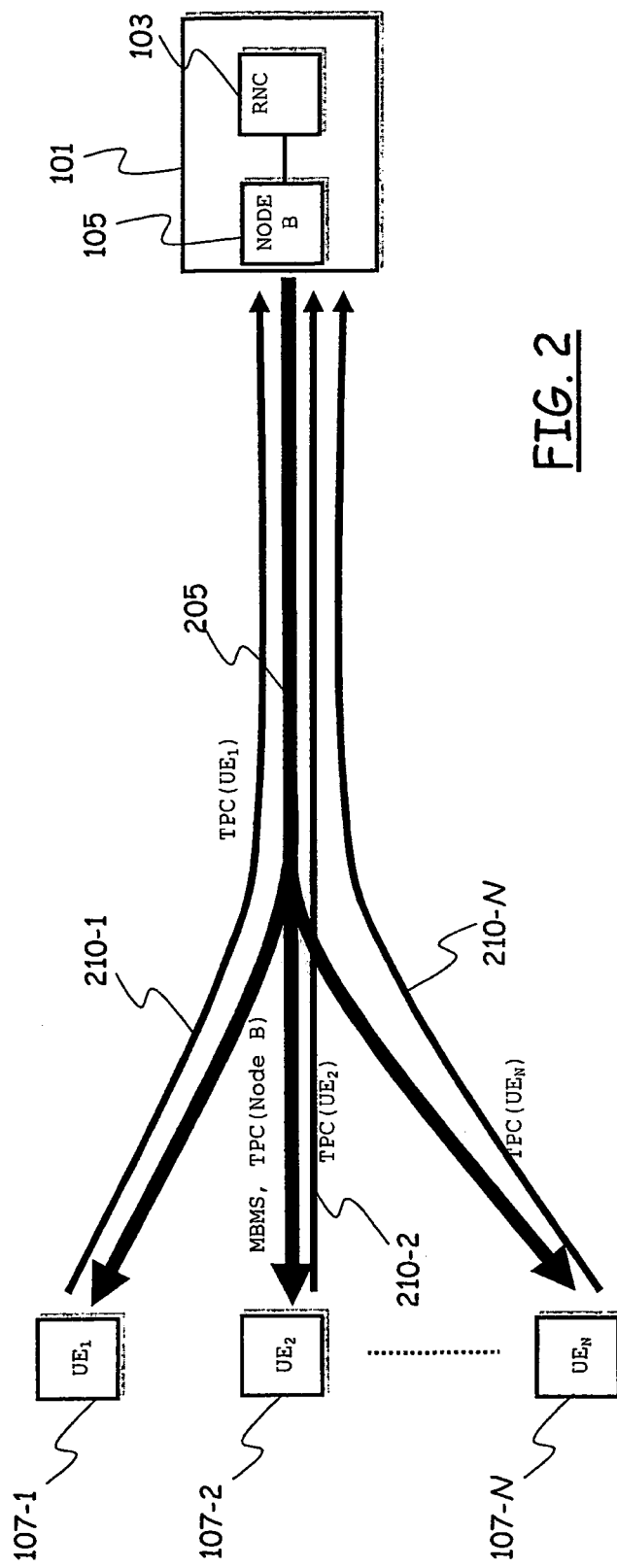
FIG. 2 pictorially shows a closed-loop power control scheme of a downlink common channel used for distributing an MBMB service in P-T-M mode, according to an embodiment of the present invention.

As discussed in the foregoing, according to an embodiment of the present invention, in respect of the delivery of an MBMS service, one downlink DCH (the MDCH) is involved, to which there are associated N uplink DCHs, one for each UE participating in the MBMS service. This scenario is schematically depicted in FIG. 2. In that drawing, the generic Node-B 105 of the generic UTRAN 101 of the network is depicted, providing coverage in a respective geographic area wherein N UEs 107-1, 107-2, . . . , 107-N are located which are enjoying an MBMS service delivered in P-T-M mode over a common downlink MDCH 205; to each UE 107-1, 107-2, . . . , 107-N there is associated, in uplink, a respective uplink DCH 210-1, 210-2, . . . , 210-N. The UEs 107-1, 107-2, . . . , 107-N exploit the respective uplink DCHs 210-1, 210-2, . . . , 210-N for communicating to the Node-B 105 the respective TPC commands $TPC(UE_1)$, $TPC(UE_2)$, . . . , $TPC(UE_N)$. In addition to being used for distributing the MBMS service data, the MDCH 205 is also exploited by the Node B 105 for sending to the UEs TPC commands TPC(Node B), to which the UEs respond by increasing/decreasing the power of the respective uplink DCHs 210-1, 210-2, . . . , 210-N. At the physical level, each transport-layer DCH, like the MDCH 205 and the DCHs 210-1, 210-2, . . . , 210-N, is mapped onto two corresponding physical channels, namely the Dedicated Physical Data Channel (DPDCH), transporting the data, and an associated Dedicated Physical Control Channel (DPCCH), transporting control information, particularly the TPC commands.

In the following of the present description, closed-loop power control methods according to embodiments of the present invention will be described.

Figure 3:
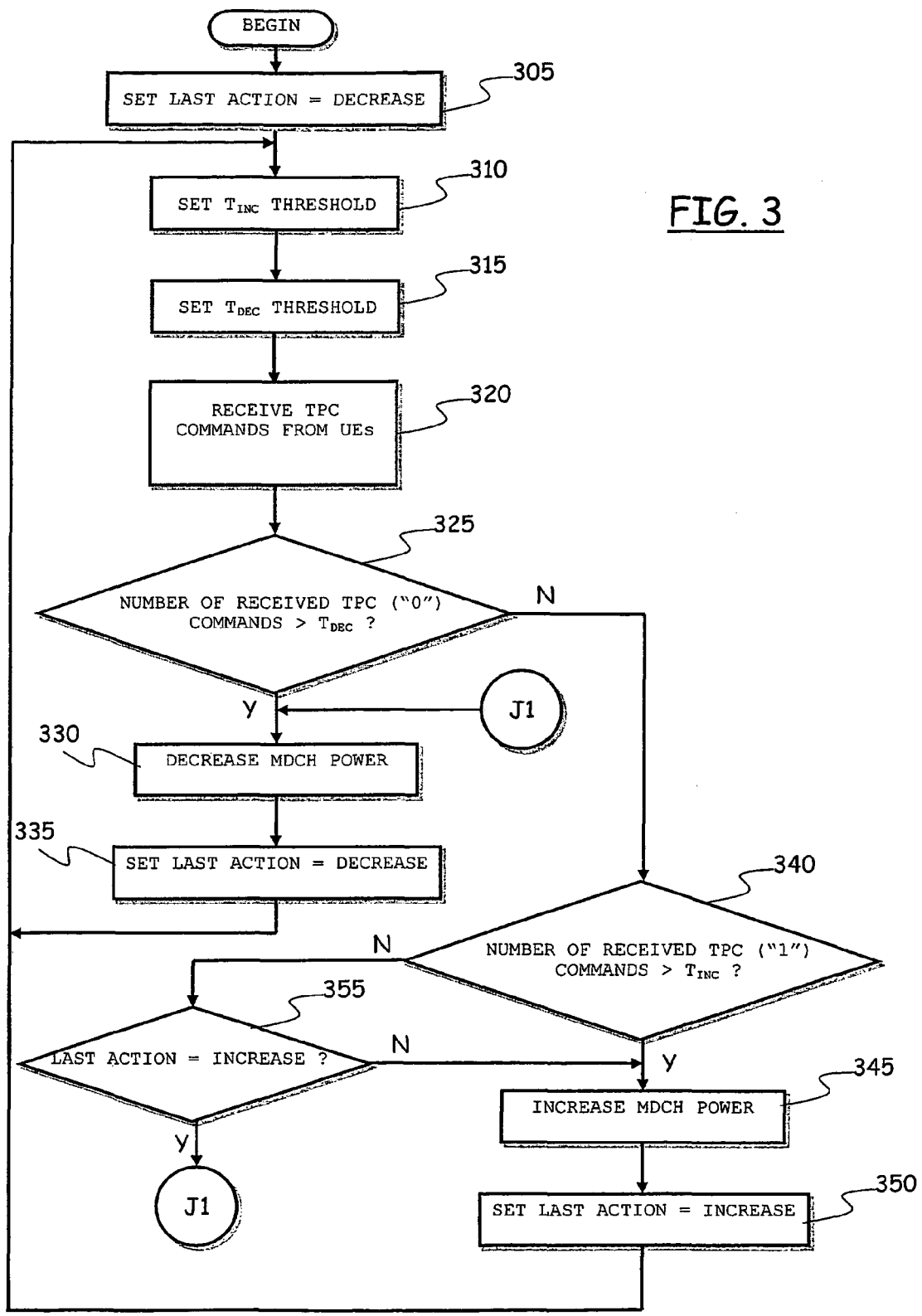
FIG. 3 is a simplified flowchart illustrating the main actions performed by a radio front-end of the network for controlling a power of the common downlink channel used for distributing the MBMS service, in an embodiment of the present invention.

Firstly, an exemplary method for controlling the power of the common downlink channel MDCH is described, making reference to the simplified flowchart of FIG. 3.

As prescribed by the current 3GPP standard for a generic downlink DCH, at predefined time intervals, e.g. every 0.625 ms, the UTRAN collects from the UEs the TPC commands; similarly, every, e.g., 0.625 ms the UTRAN controls the power of the downlink DCH, by either increasing or decreasing the power increase/decrease is of predefined amounts. According to an embodiment of the present invention these actions are also performed for the MDCH.

Firstly, a flag indicative of the last action performed by the UTRAN (increase MDCH power/decrease MDCH power) is set, for example to DECREASE (block 305).

According to an embodiment of the present invention, the UTRAN implements a statistical decision method; to this purpose, in an embodiment of the present invention, two thresholds are defined: a first threshold $T_{INC}$ exploited by the UTRAN for deciding to increase the MDCH power, and a second threshold $T_{DEC}$, exploited by the UTRAN for deciding to decrease the MDCH power. In particular, the first threshold $T_{INC}$ is a number defining how many TPC commands equal to "1" need to be received by the UTRAN for decreeing an increase of the MDCH power; similarly, the second threshold $T_{DEC}$ is a number defining how many TPC commands equal to "0" need to be received by the UTRAN for decreeing an MDCH power reduction. For example, the first and second thresholds $T_{INC}$ and $T_{DEC}$ are set (blocks 310 and 315) taking respective predefined fractions of an overall number of TPC commands received by the UTRAN, which number in turn depends on how many UEs are receiving, at a given time, the MBMS service.

When an MBMS session start is ordered, the UTRAN may calculate the initial transmit power on the downlink taking into account the different positions of the different users in the cell; this can be done taking into account the open loop information derived by the RACH access procedure, i.e. based on the open loop power control mechanism used for the access to the RACH.

At the predefined time, the UTRAN receives from the UEs 107-1, 107-2, . . . , 107-N the respective TPC commands $TPC(UE_1)$, $TPC(UE_2)$, . . . , $TPC(UE_N)$ (block 320).

The UTRAN then counts the TPC commands equal to "0", and compares the obtained number to the threshold $T_{DEC}$ (decision block 325): if the number of TPC commands equal to "0" received exceeds the set threshold $T_{DEC}$ (exit branch Y of decision block 325), meaning that the number of UEs requesting to decrease the MDCH power exceeds the set threshold number, the UTRAN decreases the MDCH power (block 330), then sets the last action flag to DECREASE (block 335), and the operation flow jumps back to block 310 (the thresholds are for example periodically re-calculated, for tracking changes in the number of UEs exploiting the MBMS service; alternatively, the operation flow may jump back to block 320).

If, on the other hand, the number of received TPC commands equal to "0" does not exceed the set threshold $T_{DEC}$ (exit branch N of decision block 325), meaning that the number of UEs requesting to decrease the MDCH power is less than the set threshold number, the UTRAN counts the TPC commands equal to "1", and compares the obtained number to the threshold $T_{INC}$ (decision block 340); if the number of TPC commands equal to "1" received exceeds the set threshold $T_{INC}$ (exit branch Y of decision block 340), meaning that the number of UEs requesting to increase the MDCH power exceeds the set threshold number, the UTRAN increases the MDCH power (block 345), then sets the last action flag to INCREASE (block 350), and the operation flow jumps back to block 310.

If, on the contrary, the number of TPC commands equal to "1" received does not exceed the set threshold $T_{INC}$ (exit branch N of decision block 340), meaning that the number of UEs requesting to increase the MDCH power does not exceed the set threshold number, the UTRAN simply checks which has been the last action performed, INCREASE or DECREASE (decision block 355): if the last action performed has been an INCREASE (exit branch Y of decision block 355), the MDCH power is decreased (connector J1 and block 330) and the last action flag is set to DECREASE (block 335); then, the operation flow jumps back to block 310. If instead the last action performed has been an DECREASE (exit branch N of decision block 355), the MDCH power is increased (block 345) and the last action flag is set to INCREASE (block 350); then, the operation flow jumps back to block 310.

In a preferred embodiment of the present invention, a time integration may be implemented. For example, a time window may be defined, and the decision on whether to increase or decrease the MDCH power may be taken by applying the above described method (comparison of the numbers of TPC commands equal to "1" or "0" with respective thresholds) on a collection of TPC commands received by the UTRAN in a time corresponding to the defined time window. Possibly, two time windows may be defined instead of a single one, a first time window to be used in respect of the test of whether to increase the MDCH power, a second time window to be used instead in respect of the test of whether to decrease the MDCH power).

Thanks to the described MDCH power control method, the network operator has the flexibility to implement different power control strategies, possibly balancing the trade off between quality of the MBMS service and capacity spent on the network to support the service. For instance, a network operator who wishes to guarantee a high service quality for all the users of the MBMS service can decide to increase the MDCH power also when even a single TPC command equal to "1" is received from the UEs; however, such a solution is less preferred in that it may lead to a less-than-optimized network capacity. A more pragmatic approach may act on a statistic basis, taking into account the total number of users, setting for instance a threshold of 90 or 95 percent of the total number of users in the system; in this case, the MDCH power may be increased only if the 90%, or the 95% of the users request to increase the MDCH power.

It is however pointed out that the specific way the TPC commands received from the UEs are processed for determining the power control of the MDCH is not critical and limitative to the present invention: different solutions for the TPC commands processing algorithm are possible.

It is furthermore pointed out that the above-described operation flow may be simplified in case the radio access network can not only, at the predetermined times, increase or decrease the power, but also hold it at a prescribed level.

Hereinafter, a method for controlling the power of the UE-specific uplink DCHs is described, making reference to the simplified flowchart of FIG. 4.

In this case, only one DPCCH is available on the downlink (i.e., the DPCCH mapped onto the single, common downlink transport channel MDCH); as a consequence the network can send to the UEs (with the prescribed time schedule) a single TPC command conditioning the uplink channel transmission power of all the UEs in the cell that are exploiting the MBMS service.

It is worth pointing out that, although for the MBMS service provisioning the downlink path is involved in the transmission of MBMS service data to the users, controlling the power of the uplink channels associated with the different UEs is nonetheless very important for the stability of the radio bearer. In particular, it is important from the signaling point of view to close the power control loop on the uplink, ensuring also on the uplink the fulfillment of the minimum SIR, in order to ensure a proper quality of service (matching at least the minimum SIR allows guaranteeing the stability of the data transmission for the user). This goal should be achieved by saving, at the same time, as much power as possible: in fact, in CDMA-based radio system, the capacity is directly connected to the total level of interference power received at the Node B receiver; thus, in order to save capacity, it is important to limit the transmitted power on the uplink.

According to an embodiment of the present invention, a method is proposed that allows guaranteeing the maintenance of the uplink DPCCHs of the UEs involved in the MBMS service distribution, at the same time limiting the power consumption on the uplink path.

According to the MBMS architecture and procedures described in the foregoing, it is assumed that, in a first phase, the radio signaling between the generic UE involved in the distribution of an MBMS service and the network is performed by means of a pair of DCH channels for each UE (one DCH channel in uplink, and the other DCH channel in downlink). During this phase, the radio signaling is established between the UE and the network. This phase allows to initialize the transmission power on the uplink of each UE as a function of the electromagnetic distance of each UE from the Node B of the cell in which the UE is currently located (i.e. the maximum path loss experienced by the UE). Depending on the UEs position, the transmission power of different UEs on the uplink may differ within a significant power range (e.g., up to at least 71 dB). After this initial phase, according to the procedures described in the foregoing, the UEs involved in the MBMS service distribution, under control of the UTRAN, will maintain on the uplink the same DCH channels previously assigned (one for each UE), but all of the UEs involved in the P-T-M MBMS service distribution will switch to the MDCH on the downlink, common for all the MBMS users.

Similarly to the UEs, the UTRAN continuously monitors the quality of the uplink radio channels individually associated with the different UEs participating to the MBMS service distribution; for example, also the UTRAN estimates for each uplink channel the SIR, obtaining N SIR estimations $SIR_{est,1}$, $SIR_{est,2}$, ..., $SIR_{est,N}$. Additionally, the UTRAN compares each of the N SIR estimations $SIR_{est,1}$, $SIR_{est,2}$, ..., $SIR_{est,N}$ to a target SIR $SIR_{target}$; the target SIR may be the same target SIR introduced in the foregoing for the power control of the downlink channel or, more generally, a different target value; even more generally, the SIR target may be user-specific (i.e., N different SIR targets may be defined), calculated as a result of the convergence of the open loop power control during the initialization of the transmission power on the uplink of each UE; otherwise, the SIR target may be common to all the UEs involved in the MBMS service distribution, and it can be calculated considering the maximum among the SIR targets of all the UEs after the initialization of the transmission power, or the average of such plurality of SIR targets.

Let $S_i$, with i=1, 2, ..., N, denote a two-valued function the result of the comparison $SIR_{est,i} < SIR_{target}$ for the uplink channel associated with the i-th UE: it will be:

$$S_i = 0 \text{ if } SIR_{est,i} > SIR_{target}, S_i = 1 \text{ if } SIR_{est,i} > SIR_{target}$$

According to an embodiment of the present invention, a method is proposed according to which the UTRAN tries to:
- guarantee that the target SIR for each one of the uplink paths associated with the different UEs is respected;
- control the number of UEs with a SIR above the SIR target; and
- ensure that the N UEs do not spend a power on the uplink greater than a threshold defined in respect of the MBMS service by the network operator.

Let the following parameters be defined:
SIR_TARGET_UE: target SIR for the generic UE involved in the MBMS service distribution, defined by the UTRAN; as discussed above, it can be a UE-specific value, or a value common to all the UEs, calculated for example in the way mentioned in the foregoing;
SIR_MAX_UE: maximum SIR for the generic UE involved in the MBMS service distribution, defined with respect to the target SIR $SIR_{target}$; this parameter defines the maximum SIR that the network operator wants to spend for each uplink path;
SIR_MIN_UE: minimum SIR for the generic UE involved in the MBMS service distribution, defined with respect to the target SIR $SIR_{target}$; this parameter defines the minimum quality that the network operator considers acceptable on the uplink path;
MAX_UL_MBMS_Power: maximum interference power generated on the uplink by UEs of MBMS users that defines the maximum uplink capacity that can be tolerated by the mobile operator in respect of MBMS services. In particular, the parameter MAX_UL_MBMS_Power may be calculated as follows:

MAX_µL_MBMS_Power=min(P_MBMS_UL, P_AC)

wherein: P_MBMS_UL is a parameter denoting an estimated power on the uplink that can be calculated by knowing the number of MBMS users in the cell, the target SIR $SIR_{target}$ and the percentage of users that reached the maximum SIR for the generic UE (SIR_MAX_UE), plus an extra power component as a margin introduced by the mobile operator; and P_AC is a network parameter identifying the maximum power admitted in the cell on the uplink according to the admission control, an algorithm that is implemented in each (W)CDMA network in order to ensure stability of the radio network avoiding that an interference and/or load threshold is not overcome in each cell.

In a preferred embodiment of the invention, a time integration may be implemented also in respect of the uplink power control. To this purpose, a time window of size N_W may be defined, wherein the time window size N_W may be an integer that indicates the number of power control time slots, i.e. the number of consecutive SIR checks to be waited for before starting to take a decision, and, once the regime is reached, the number of consecutive SIR check results to be considered for taking a decision on the TPC command to be issued. For example, the time window size N_W may range from 1 (only the result of the last SIR check is considered), up to 15 (which, considering that the SIR check is performed every 0.625 ms, means a time window of 10 ms).

The above parameters are for example defined by the network operator.

An algorithm that implements a method according to an embodiment of the present invention receives as inputs the SIR_MIN_UE, the SIR_MAX_UE, the time window size N_W, and a (measured) instantaneous value P_UE_UL_MBMS of the interference power generated on the uplink by the UEs of MBMS users.

Figure 4:
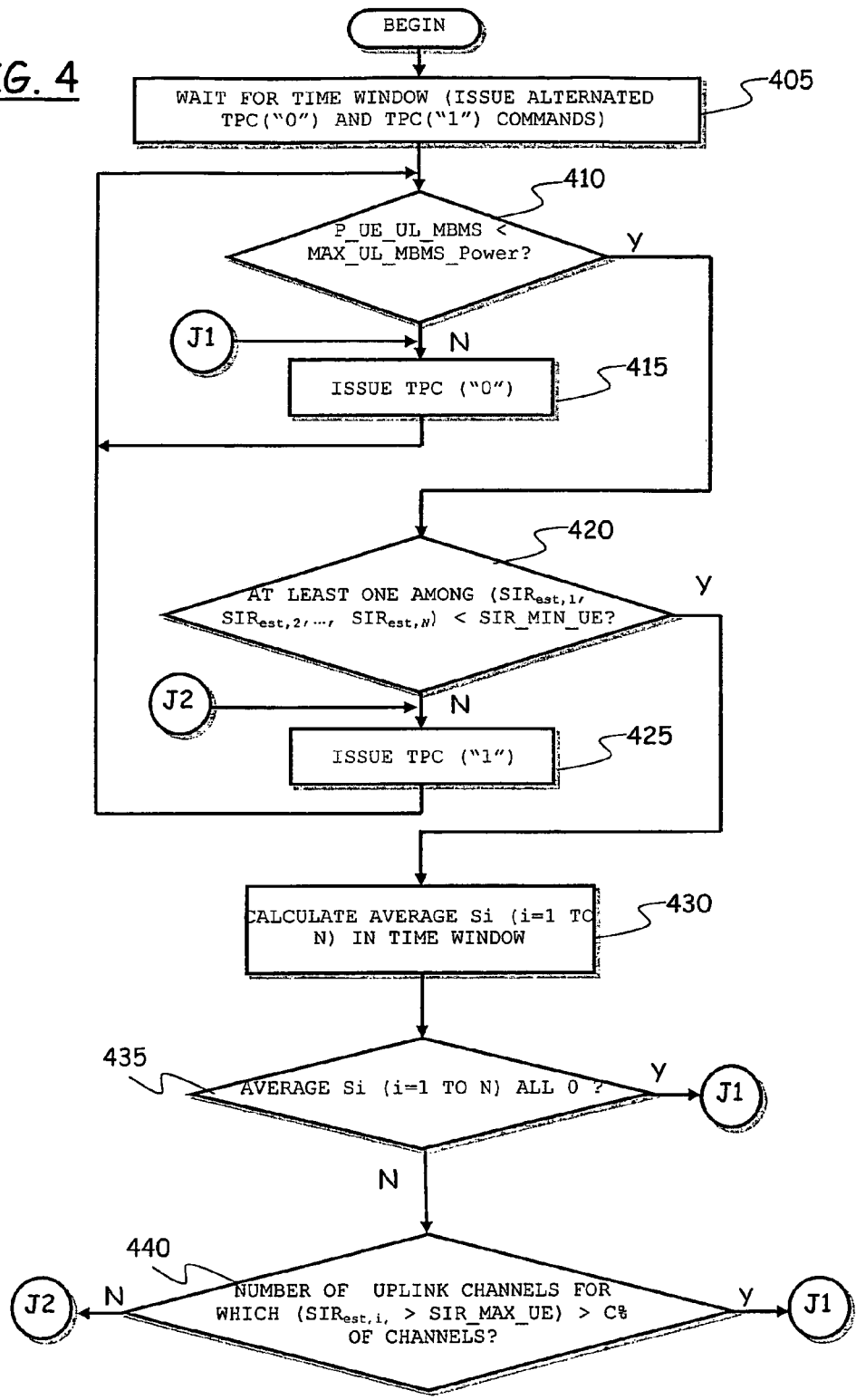
FIG. 4 is a simplified flowchart illustrating the main actions performed by the radio front end of the network for causing the UEs involved in the distribution of the MBMS service to control a power of respective uplink radio channels, in an embodiment of the present invention.

An algorithm implementing the method according to an embodiment of the present invention will be now described, making reference to the schematic flowchart of FIG. 4.

Initially, the UTRAN waits for a time interval equal to the defined window size N_W; during this time interval, for each one of the N uplink DCHs associated with the N UEs involved in the distribution of the MBMS service, the UTRAN periodically compares the estimated SIR $SIR_{est,1}$, $SIR_{est,2}$, ..., $SIR_{est,N}$ to the target SIR $SIR_{target}$, according to the prescribed time schedule (e.g., every 0.625 ms), thus obtaining (for each uplink DCH) a respective value $S_i$; during this time interval, the UTRAN does not take any decision on which TPC command to be issued; possibly, the UTRAN simply issues alternated TPC "0" and TPC "1" commands (which are transmitted to the UEs over the downlink DPCCH associated with the MDCH), so as to keep constant the power of the uplink channels (block 405) (if available, the radio access network may simply issue a TPC "hold" command). In this way, for each uplink channel, a collection of a number N_W of consecutive values $S_i$ is obtained.

The UTRAN then checks whether the (measured) instantaneous value P_UE_UL_MBMS of the interference power generated on the uplink by the UEs of MBMS users is below the maximum admissible threshold established by the predetermined maximum interference power MAX_UL_MBMS_Power (decision block 410). In the negative case (exit branch N of decision block 410), the UTRAN issues a TPC "0" command, which is received by all the UEs involved in the MBMS service over the DPCCH associated with the MDCH (block 415); as a consequence, all the UEs involved in the MBMS service will decrease the power of the associated uplink channel. The operation flow jumps back to block 410, and the operations are repeated according to the prescribed time schedule (i.e., after 0.625 ms).

If instead the maximum admissible threshold MAX_UL_MBMS_Power is not exceeded (exit branch Y of decision block 410), the UTRAN checks the actual estimated SIR $SIR_{est,1}$, $SIR_{est,2}$, ..., $SIR_{est,N}$ of the N uplink DCHs. In particular, the UTRAN checks whether at least one of the estimated SIRs $SIR_{est,1}$, $SIR_{est,2}$, ..., $SIR_{est,N}$ is below the predetermined minimum allowed SIR SIR_MIN_UE (decision block 420). In the negative case (exit branch N of decision block 420), the UTRAN issues a TPC "1" command, which is received by all the UEs involved in the MBMS service over the DPCCH associated with the MDCH (block 425); as a consequence, all the UEs involved in the MBMS service will increase the power of the associate uplink channel. The operation flow jumps back to block 410, and the operations are repeated according to the prescribed time schedule (i.e., after 0.625 ms). In the affirmative case (exit branch Y of decision block 420), the UTRAN calculates average values, over the specified time window, of the values Si (i=1, 2, N) obtained, for the generic uplink channel, by comparing the estimated SIR to the target SIR (block 430); a possible method for calculating the above-mentioned average values will be described afterwards.

If the UTRAN ascertains that all the calculated average values Si (i=1, 2, N) are 0 (decision block 435, exit branch Y), the UTRAN issues a TPC "0" command (connector J1, block 415), which is received by all the UEs involved in the MBMS service and, as a consequence, all the UEs involved in the MBMS service will decrease the power of the associate uplink channel. In the negative case (exit branch N of decision block 435), the UTRAN checks whether the number of actual estimated SIR values which exceeds the maximum SIR SIR_MAX_UE is higher than a predefined fraction C % (e.g., 50%) of the total number of uplink channels (decision block 440): in the affirmative case (exit branch Y of decision block 440, connector J1), the UTRAN issues a TPC "0" command, otherwise it issues a TPC "1" command (exit branch N of decision block 440, connector J2).

Figure 5:
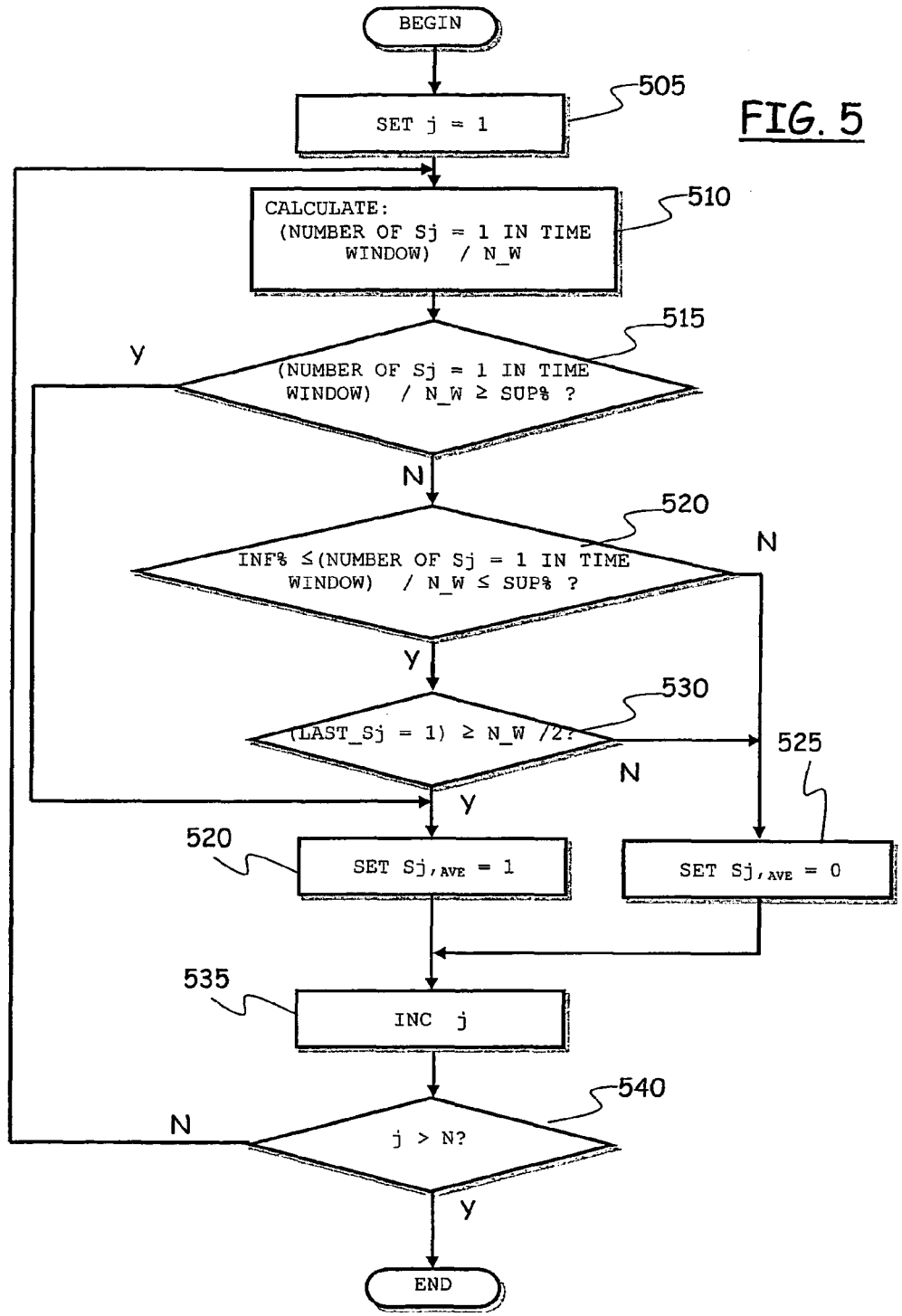
FIG. 5 is a simplified flowchart of an exemplary procedure used within a procedure according to the flowchart of FIG. 4.

The flowchart of FIG. 5 shows the main operations of a possible procedure for calculating the above-mentioned average values.

The procedure includes a part that has to be iterated over all the N uplink DCHs; thus, a counter j is firstly initialized to, e.g. 1 (block 505).

Then, for the generic, j-th uplink DCH the UTRAN takes the last N_W values Sj, result of the SIR check, and calculates the ratio of the number of Sj values which are equal to 1 to the total number N_W of Sj values (block 510), i.e. the UTRAN calculates the percentage of Sj=1 in the time window.

The UTRAN then ascertain whether the calculated ratio is equal to or higher than a first, upper threshold SUP %, for example 80% (decision block 515). In the affirmative case (exit branch Y of decision block 515), the UTRAN sets the average value $Sj_{,AVE}$ equal to 1 (block 520). In the negative case (exit branch N of decision block 515), the UTRAN checks whether the calculated ratio is in a range from a second, lower threshold INF % to the upper threshold SUP %. In the negative case (exit branch N of decision block 520), the UTRAN sets the average value $Sj_{,AVE}$ equal to 0 (block 525), otherwise (exit branch Y of decision block 520) the UTRAN checks whether the number of consecutive, more recent values Sj=1 exceeds a predetermined fraction D % (e.g., 50%) of the total number N_W of SIR checks performed in the time window (decision block 530): in the affirmative case (exit branch Y of decision block 530), the UTRAN sets the average value $Sj_{,AVE}$ equal to 1 (block 520), whereas in the negative case the average value $Sj_{,AVE}$ is set equal to 0 (block 525).

These operations are repeated for all the N uplink DCH channels, by increasing the counter j (block 535), until it exceeds the total number N (decision block 540).

The method described allows, with the parameter MAX_UL_MBMS_Power calculated in the way previously discussed, to guarantee the full exploitation of the capacity reserved by the mobile operator to MBMS users; ensuring at the same time the respect of the target SIR for each MBMS DCCH (Dedicated Control CHannel) on the uplink.

It is however pointed out that the algorithms described are merely exemplary and not per-se limitative to the present invention: other algorithms for controlling the closed-loop power control, particularly for the control of the power of the uplink channels individually associated with the different UEs participating to an MBMS service are possible.

The distribution of the MBMS service data may be accomplished with or without implementing retransmission policies; in particular, both the RLC unacknowledged mode (i.e., without retransmissions) and the RLC acknowledged mode are possible.

In particular, retransmissions can be avoided, and the QoS of the radio link be increased (the use of a power-controlled common channel MDCH for distributing the MBMS service data allows to save capacity with respect to standard solution); the value of the target SIR for a certain service may be increased (corresponding to a lower value for the BLER target value signaled by UTRAN to the UE). According to this solution, an extra power and then an extra capacity are required for a certain service in order to compensate the changes in the radio propagation conditions, conditions that can not be dynamically managed since no retransmission is allowed.

Alternatively, a statistical retransmission mechanism may be implemented. Since on the uplink for each single user an individual DCH channel is allocated, retransmissions can be supported. Since however the network can receive multiple requests for retransmission coming from different users, all related to a same data packet, in analogy with what already proposed for the power control, statistical retransmission algorithms can be implemented. For example, when a number M of retransmission requests for a certain data packet are sent by a single user to the network, the following actions can be performed: if the number of retransmission requests is equal to or greater than a predetermined threshold N_User_max_retransmit, the network retransmits the data packet. However, it may be provided that the maximum number of times the same packet is retransmitted can not be greater than a predefined maximum number Npacket_max_retransmit.

This solution gives the network operators the flexibility to implement different strategies. For instance, setting the parameter N_User_max_retransmit to 1, and the parameter Npacket_max_retransmit to 3, whenever a request for data packet retransmission is sent by a user, the data packet is retransmitted up to a maximum number of times equal to three.

It is pointed out that although in the foregoing an implementation of the invention has been considered which adheres to the 3GPP R6 standard, an alternative embodiment, it is possible to reuse the mechanism described above to handle MBMS over DCH without considering the logical channels (MTCH, MCCH, MICH, etc.) defined in the framework of the R6 of 3GPP standard. The R99 CTCH (Common Traffic CHannel) might be mapped over a DCH, exploiting the closed-loop power control mechanisms above described according to exemplary embodiments of the present invention.

Thanks to the present invention, it is possible to distribute information contents such as multimedia contents in an efficient P-T-M mode, exploiting a common distribution channel, at the same ensuring a control of the transmission power substantially equal to that foreseen for UE-specific channels. The implementation of the present invention does not require strong changes to the currently available UEs: the impact on the complexity of the UEs is quite limited and, in principle, only minor changes in the UEs' resident software/firmware are needed. In addition, also the impact on the UTRAN is mainly limited to minor changes in some algorithms essentially located at the Node B.

The invention claimed is:
1. A method of distributing information content to at least two user equipments, comprising:
   setting up a downlink channel common to the at least two user equipments;

setting up at least two uplink channels, each uplink channel being dedicated to a respective one of said at least two user equipments;

delivering the information content to said at least two user equipments over said common downlink channel; and controlling transmission powers related to said common downlink channel and said at least two uplink channels in a closed-loop fashion, wherein said controlling transmission powers in a closed-loop fashion comprises:

receiving from the at least two user equipments common downlink channel quality indications over the respective dedicated uplink channels;

adjusting a transmission power with respect to said common downlink channel based on the common downlink channel quality indications received from the user equipments;

evaluating a channel quality with respect to each of said at least two dedicated uplink channels, wherein evaluating a channel quality further comprises:

defining a time window;

for each one of the at least two dedicated uplink channels, obtaining at least two uplink channel quality indications temporally separated within said time window, wherein said uplink channel quality indications are obtained by comparison with a respective uplink channel quality threshold;

for each one of the at least two dedicated uplink channels, obtaining an average uplink channel quality indication from said at least two temporally separated uplink channel quality indications; and obtaining an overall uplink channel quality based on the average uplink channel quality indications with respect to the at least two dedicated uplink channels; and based on said evaluation, sending to the at least two user equipments a transmission power control command over the common downlink channel.

2. The method according to claim 1, wherein said adjusting a transmission power with respect to said common downlink channel based on the common downlink channel quality indications received from the user equipments comprises performing a statistical analysis of the common downlink channel quality indications received from the at least two user equipments.

3. The method according to claim 2, wherein said performing the statistical analysis comprises:

increasing the transmission power with respect to the common downlink channel in case a number of received channel quality indications indicating a channel quality below a prescribed target quality exceeds a predetermined first threshold number of received channel quality indications.

4. The method according to claim 3, wherein said performing the statistical analysis comprises:

decreasing the transmission power with respect to the common downlink channel in case a number of received channel quality indications indicating a channel quality higher than or equal to a prescribed target quality exceeds a predetermined second threshold number of received channel quality indications.

5. The method according to claim 4, wherein said first threshold or said second threshold number of received channel quality indications are dependent on an overall number of said at least two user equipments.

6. The method according to claim 1, wherein said evaluating a channel quality with respect to each of said at least two dedicated uplink channels comprises establishing an overall uplink channel quality based on the evaluated channel qualities of the at least two dedicated uplink channels.

7. The method according to claim 1, wherein said transmission power control command sent to the at least two user equipments over the common downlink channel is commonly received by the at least two user equipments and causes the at least two user equipments to vary in a same way as transmission power of the respective dedicated uplink channels.

8. The method according to claim 1, wherein said sending to the at least two user equipments a transmission power control command over the common downlink channel, based on said evaluation, comprises:

ascertaining whether an overall interference power associated with said dedicated uplink channels exceeds a predetermined maximum interference power, and in the affirmative case, sending to the at least two user equipments a transmission power decrease command, adapted to instruct the at least two user equipments to decrease a transmission power with respect to the associated dedicated uplink channels.

9. The method according to claim 1, wherein said sending to the at least two user equipments a transmission power control command over the common downlink channel, based on the said evaluation, further comprises:

ascertaining whether at least one of said at least two dedicated uplink channels has an associated uplink channel quality lower than a predetermined minimum uplink channel quality, and in the affirmative case, sending to the at least two user equipments, a transmission power increase command, adapted to instruct the at least two user equipments to increase a transmission power with respect to the associated dedicated uplink channels.

10. The method according to claim 1, wherein said sending to the at least two user equipments a transmission power control command over the common downlink channel, based on said evaluation, further comprises:

ascertaining whether an overall number of dedicated uplink channels, among said at least two dedicated uplink channels, having an associated uplink channel quality exceeding said predetermined minimum uplink channel quality exceeds a predetermined threshold number of dedicated uplink channels, and in the affirmative case, sending to the at least two user equipments said transmission power decrease command.

11. The method according to claim 10, wherein said threshold number of dedicated uplink channels depends on an overall number of said at least two user equipments.

12. The method according to claim 1, wherein said obtaining an average uplink channel quality indication comprises:

calculating a number of temporally-separated uplink channel quality indications indicating that the uplink channel quality is higher than or equal to said uplink channel quality threshold;

ascertaining whether said number of temporally-separated uplink channel quality indications exceeds a predetermined first threshold number of temporally-separated uplink channel quality indications; and in the affirmative case, having said average uplink channel quality indication indicate that the uplink channel quality is higher than or equal to said uplink channel quality threshold.

13. The method according to claim 12, wherein said obtaining an average uplink channel quality indication further comprises:

ascertaining whether said number of temporally-separated uplink channel quality indications does not exceed a predetermined second threshold number of temporally-separated uplink channel quality indications; and in the affirmative case, having said average uplink channel quality indication indicate that the uplink channel quality is lower than said uplink channel quality threshold.

14. The method according to claim 12, wherein said obtaining an average uplink channel quality indication further comprises:

having said average uplink channel quality indication indicate that the uplink channel quality is higher than or equal to said uplink channel quality threshold in case a number of more recent temporally-separated uplink channel quality indications indicating that the uplink channel quality is higher than or equal to said uplink channel quality threshold exceeds a predetermined third threshold number of temporally-separated uplink channel quality indications.

15. A wireless communications network comprising at least one radio transceiver station having an associated network cell and adapted to enable radio communications with user equipments located in the network cell, wherein the radio transceiver station is adapted to:

set up a common downlink channel with respect to at least two user equipments located in the network cell;

set up at least two dedicated uplink channels, each dedicated uplink channel being dedicated to a respective one of said at least two user equipments;

deliver an information content to said at least two user equipments over said common downlink channel;

receive from the at least two user equipments common downlink channel quality indications over the respective dedicated uplink channels;

adjust a transmission power with respect to said common downlink channel based on the common downlink channel quality indications received from the user equipments;

evaluate a channel quality related to each of said at least two dedicated uplink channels, based on said evaluation, send to the at least two user equipments a transmission power control command over the common downlink channel, define a time window;

for each one of the at least two dedicated uplink channels, obtain at least two uplink channel quality indications temporally-separated within said time window, wherein said uplink channel quality indications are obtained by comparison with a respective uplink channel quality threshold;

for each one of the at least two dedicated uplink channels, obtain an average uplink channel quality indication from said at least two temporally-separated uplink channel quality indications; and obtain an overall uplink channel quality based on the average uplink channel quality indications with respect to the at least two dedicated uplink channels.

16. The wireless communications network according to claim 15, wherein said radio transceiver station is adapted to adjust the transmission power with respect to said common downlink channel based on a statistical analysis of the common downlink channel quality indications received from the at least two user equipments.

17. The wireless communications network according to claim 16, wherein said radio transceiver station is adapted to:

increase the transmission power with respect to the common downlink channel in case a number of received channel quality indications indicating a channel quality below a prescribed target quality exceeds a predetermined first threshold number of received channel quality indications.

18. The wireless communications network according to claim 17, wherein the radio transceiver station is adapted to:

decrease the transmission power with respect to the common downlink channel in case a number of received channel quality indications indicating a channel quality higher than or equal to a prescribed target quality exceeds a predetermined second threshold number of received channel quality indications.

19. The wireless communications network according to claim 18, wherein said first threshold or said second threshold are dependent on an overall number of said at least two user equipments.

20. The wireless communications network according to claim 15, wherein the radio transceiver station is adapted to establish an overall uplink channel quality based on the evaluated channel qualities of the at least two dedicated uplink channels.

21. The wireless communications network according to claim 15, wherein said transmission power control command sent to the at least two user equipments over the common downlink channel is commonly received by the at least two user equipments and causes the at least two user equipments to vary in a same way as transmission power of the respective dedicated uplink channels.

22. The wireless communications network according to claim 15, wherein the at least one radio transceiver station is adapted to:

ascertain whether an overall interference power associated with said dedicated uplink channels exceeds a predetermined maximum interference power, and in the affirmative case, send to the at least two user equipments a transmission power decrease command, adapted to instruct the at least two user equipments to decrease a transmission power with respect to the associated dedicated uplink channels.

23. The wireless communications network according to claim 15, wherein the radio transceiver station is adapted to:

ascertain whether at least one of said at least two dedicated uplink channels has an associated uplink channel quality lower than a predetermined minimum uplink channel quality, and in the affirmative case, send to the at least two user equipments a transmission power increase command, adapted to instruct the at least two user equipments to increase a transmission power with respect to the associated dedicated uplink channels.

24. The wireless communications network according to claim 15, wherein the radio transceiver station is adapted to:

ascertain whether an overall number of dedicated uplink channels, among said at least two dedicated uplink channels, having an associated uplink channel quality, exceeding said predetermined minimum uplink channel quality exceeds a predetermined threshold number of dedicated uplink channels, and in the affirmative case, send to the at least two user equipments said transmission power decrease command.

25. The wireless communications network according to claim 24, wherein said threshold number of dedicated uplink channels depends on an overall number of said at least two user equipments.

26. The wireless communications network according to claim 15, wherein the radio transceiver station is adapted to:

calculate a number of temporally-separated uplink channel quality indications indicating that the uplink channel quality is higher than or equal to said uplink channel quality threshold;

ascertain whether said number of temporally-separated uplink channel quality indications exceeds a predetermined first threshold number of temporally-separated uplink channel quality indications; and in the affirmative case, have said average uplink channel quality indication indicate that the uplink channel quality is higher than or equal to said uplink channel quality threshold.

27. The wireless communications network according to claim 26, wherein the radio transceiver station is adapted to:

ascertain whether said number of temporally-separated uplink channel quality indications does not exceed a predetermined second threshold number of temporally-separated uplink channel quality indications; and in the affirmative case, have said average uplink channel quality indication indicate that the uplink channel quality is lower than said uplink channel quality threshold.

28. The wireless communications network according to claim 26, wherein the radio transceiver station is adapted to:

have said average uplink channel quality indication indicate that the uplink channel quality is higher than or equal to said uplink channel quality threshold in case a number of more recent temporally-separated uplink channel quality indications indicating that the uplink channel quality is higher than or equal to said uplink channel quality threshold exceeds a predetermined third threshold number of temporally-separated uplink channel quality indications.

* * * * *